United States Patent

Ogawa et al.

(10) Patent No.: US 7,773,148 B2
(45) Date of Patent: Aug. 10, 2010

(54) POWER SYSTEM HAVING A BATTERY UNIT THAT CALCULATE CUMULATIVE WORK VOLUME VALUE

(75) Inventors: Hidehiro Ogawa, Fanabashi (JP); Tetsushi Nomoto, Yokohama (JP)

(73) Assignees: Nikon Corporation, Tokyo (JP); Nikon Technologies Inc., Tokyo (JP)

( * ) Notice: Subject to any disclaimer, the term of this patent is extended or adjusted under 35 U.S.C. 154(b) by 0 days.

(21) Appl. No.: 12/314,570

(22) Filed: Dec. 12, 2008

(65) Prior Publication Data

US 2009/0102965 A1 Apr. 23, 2009

Related U.S. Application Data

(63) Continuation of application No. 10/808,524, filed on Mar. 25, 2004, now abandoned.

(30) Foreign Application Priority Data

Mar. 26, 2003 (JP) ............... 2003-086455
May 7, 2003 (JP) ............... 2003-128867

(51) Int. Cl.
*H04N 5/225* (2006.01)
(52) U.S. Cl. .................... 348/372
(58) Field of Classification Search .......... 348/372
See application file for complete search history.

(56) References Cited

U.S. PATENT DOCUMENTS 6,101,339 A 8/2000 Miki et al.
6,222,348 B1 * 4/2001 Sato et al. .......... 320/149
6,363,146 B1 3/2002 Aranovich et al.
6,526,516 B1 * 2/2003 Ishikawa et al. ........ 713/340
6,710,809 B1 * 3/2004 Niikawa .............. 348/372
7,081,924 B2 * 7/2006 Tsuda .............. 348/372
7,508,168 B2 * 3/2009 Nunomaki et al. ....... 320/132
7,528,580 B2 * 5/2009 Sim .................. 320/150
2001/0008424 A1 * 7/2001 Higuchi et al. ......... 348/372
2002/0171755 A1 11/2002 Nishimura

FOREIGN PATENT DOCUMENTS

| JP | A 2-32277 | 2/1990 |
| JP | A 8-64254 | 3/1996 |
| JP | A 10-341536 | 12/1998 |
| JP | A 2001-154250 | 6/2001 |
| JP | A 2001-209465 | 8/2001 |
| JP | A 2001-281307 | 10/2001 |
| JP | A 2001-339630 | 12/2001 |
| JP | A 2002-15780 | 1/2002 |
| JP | A 2002-107429 | 4/2002 |
| JP | A 2002-112076 | 4/2002 |

* cited by examiner

*Primary Examiner*—Tuan Ho
*Assistant Examiner*—Kent Wang
(74) *Attorney, Agent, or Firm*—Oliff & Berridge, PLC

(57) ABSTRACT

A camera includes: a battery unit on which a battery is mounted, that can be detachably loaded into the camera and supplies power to the camera; and a function unit that executes camera functions, wherein: as a function of the camera is executed, the function unit transmits information related to the executed function to the battery pack; and the battery unit has a storage unit in which the information related to the camera function is stored.

7 Claims, 15 Drawing Sheets

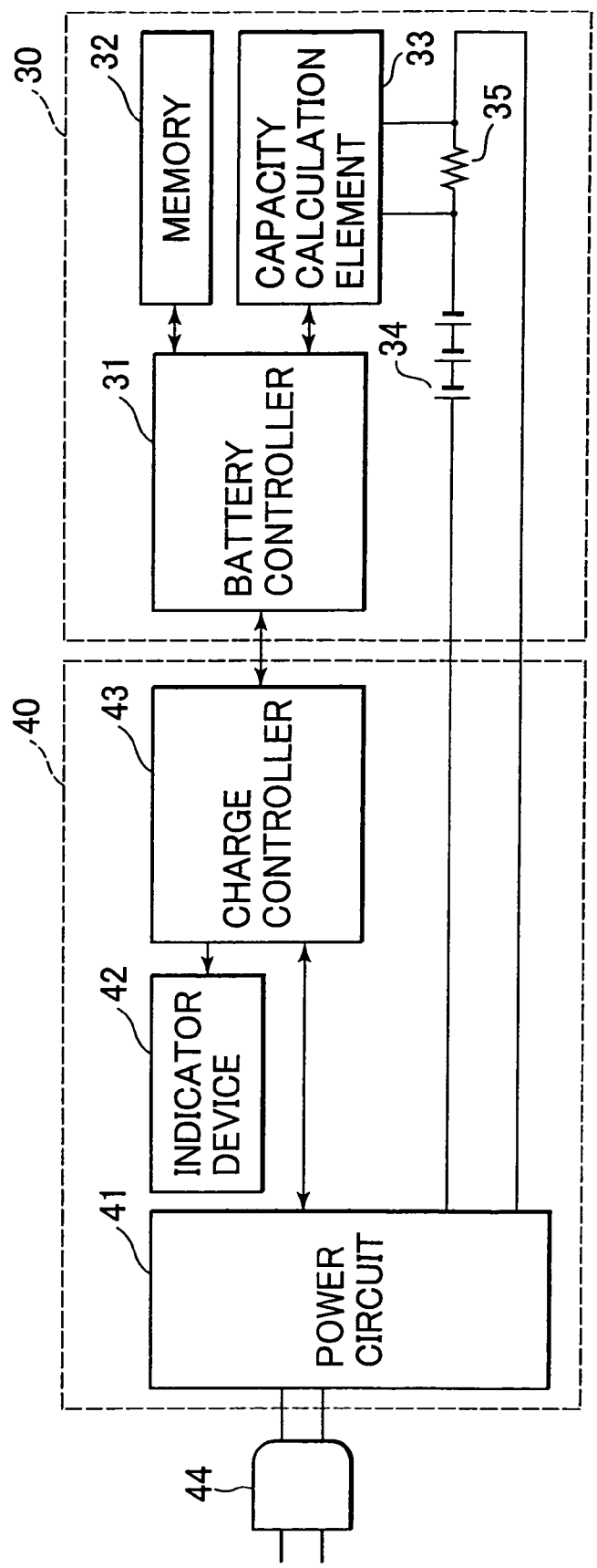

FIG.15

| NO. | PHOTOGRAPHING CONDITION | | | | NUMBER OF IMAGES THAT CAN BE PHOTOGRAPHED |
|---|---|---|---|---|---|
| | AF MODE | DISPLAY MONITOR | LIGHT EMITTING ILLUMINATION | ZOOM USE | |
| 1 | CONTINUOUS | ON | USED | USED | 5 |
| 2 | CONTINUOUS | ON | USED | NOT USED | 6 |
| 3 | SINGLE | ON | USED | USED | 6 |
| 4 | CONTINUOUS | ON | NOT USED | USED | 7 |
| 5 | SINGLE | ON | USED | NOT USED | 7 |
| 6 | CONTINUOUS | ON | NOT USED | NOT USED | 8 |
| 7 | CONTINUOUS | OFF | USED | USED | 8 |
| 8 | CONTINUOUS | OFF | USED | NOT USED | 9 |
| 9 | SINGLE | ON | NOT USED | USED | 9 |
| 10 | SINGLE | OFF | USED | USED | 9 |
| 11 | CONTINUOUS | OFF | NOT USED | USED | 10 |
| 12 | SINGLE | ON | NOT USED | NOT USED | 10 |
| 13 | SINGLE | OFF | USED | NOT USED | 10 |
| 14 | CONTINUOUS | OFF | NOT USED | NOT USED | 11 |
| 15 | SINGLE | OFF | NOT USED | USED | 12 |
| 16 | SINGLE | OFF | NOT USED | NOT USED | 13 |

POWER SYSTEM HAVING A BATTERY UNIT THAT CALCULATE CUMULATIVE WORK VOLUME VALUE

This is a Continuation of application Ser. No. 10/808,524 filed Mar. 24, 2004. The disclosure of the prior application is hereby incorporated by reference herein in its entirety.

INCORPORATION BY REFERENCE

The disclosures of the following priority applications are herein incorporated by reference:

Japanese Patent Application No. 2003-086455 filed Mar. 26, 2003

Japanese Patent Application No. 2003-128867 filed May 7, 2003

BACKGROUND OF THE INVENTION

1. Field of Invention

The present invention relates to a power system used in an apparatus such as a camera that operates on batteries and also relates to a camera.

2. Description of the Related Art

There are power systems used in cameras in the related art that indicate the number of photographs that can be taken calculated based upon the remaining battery capacity and the power requirement for taking a single photograph. Such power systems include those disclosed in Japanese Laid Open Patent Publication No. H 10-341536 and Japanese Laid Open Patent Publication No. 2001-154250.

However, a camera power system in the related art such as those described above cannot calculate the exact remaining number of photographs that can be taken on the remaining power when it is adopted in, for instance, a digital camera, in which the battery power required per frame greatly varies depending upon the length of time over which the shutter release button is held halfway down, whether or not a strobe is used, the size of the image recorded, whether or not the image is displayed at the monitor and the like.

In addition, cameras come equipped with various functions today. Digital cameras, in particular, offer many functions. However, with a digital camera in the related art, a history of consumed battery capacity that has resulted in the presently remaining battery power level, i.e., which functions of the digital camera have been engaged to lead to the presently remaining battery power level, cannot be ascertained. If the history of the consumed battery capacity in the digital camera indicating specific functions that have been engaged can be ascertained, it will be possible to generate useful information based upon the consumed battery capacity history.

SUMMARY OF THE INVENTION

The present invention provides a power system capable of ascertaining with ease the remaining work volume and the remaining work time available in an apparatus which operates on battery power.

The present invention also provides a camera with which it is possible to ascertain how the battery power has been consumed.

According to the 1st aspect of the invention, a power system comprises: a battery unit that includes a battery; and an apparatus main body that operates on power supplied from the battery in the battery unit mounted thereat, the battery unit and the apparatus main body being engaged in information exchange, wherein: a work volume value indicating a volume of work that the apparatus main body has been engaged in is transmitted from the apparatus main body to the battery unit over a predetermined cycle; the battery unit calculates a cumulative work volume value of the work volume value at the apparatus main body and stores the cumulative work volume value therein, and the battery unit also detects a consumed battery capacity value indicating an extent to which a battery power has been consumed at the apparatus main body; the cumulative work volume value, the consumed battery capacity value and a charged battery capacity value are transmitted from the battery unit to the apparatus main body over the predetermined cycle; and the apparatus main body displays a battery use rate indicating an extent to which the battery has been used based upon the consumed battery capacity value and the charged battery capacity value, and also displays the cumulative work volume value at the apparatus main body.

According to the 2nd aspect of the invention, in the power system according to the 1st aspect, it is preferred that: different operating modes of the apparatus main body are classified in correspondence to varying levels of power consumption; work volume values each corresponding to one of the operating modes are transmitted from the apparatus main body to the battery unit; the battery unit calculates and stores therein cumulative work volume values corresponding to the individual operating modes of the apparatus main body and transmits the cumulative work volume values corresponding to the individual operating modes to the apparatus main body; and the apparatus main body displays the battery use rate and the cumulative work volume values corresponding to the individual operating modes of the apparatus main body.

According to the 3rd aspect of the invention, in the power system according to the 1st aspect, it is preferred that: the battery unit allows the battery to be charged with a charge apparatus; the battery unit and the charge apparatus exchange information with each other; and the cumulative work volume value stored in the battery unit is reset to 0 when the battery has been charged by the charge apparatus.

According to the 4th aspect of the invention, in the power system according to the 2nd aspect, it is preferred that: the battery unit allows the battery to be charged with a charge apparatus; the battery unit and the charge apparatus exchange information with each other; and the cumulative work volume value stored in the battery unit is reset to 0 when the battery has been charged by the charge apparatus.

According to the 5th aspect of the invention, in the power system according to the 1st aspect, it is preferred that: the battery unit allows the battery to be charged with a charge apparatus; the battery unit and the charge apparatus exchange information with each other; the battery unit detects the charged battery capacity value and transmits the detected charged battery capacity value to the charge apparatus; the charge apparatus makes a decision based upon the charged capacity value transmitted from the battery unit as to whether or not the battery is in a fully charged state and ends a charge of the battery once the battery is judged to be in the fully charged state; and the battery unit resets the consumed battery capacity value stored in memory at the battery unit to 0 when the charge of the battery ends.

According to the 6th aspect of the invention, in the power system according to the 1st aspect, it is preferred that: the apparatus main body is a camera; and the work volume value is a number of frames of images photographed in the camera.

According to the 7th aspect of the invention, in the power system according to the 1st aspect, it is preferred that: the apparatus main body is a camera; and the work volume value is a length of time over which the camera has been engaged in use.

According to the 8th aspect of the invention, a camera comprises: a battery unit on which a battery is mounted, that can be detachably loaded into the camera and supplies power to the camera; and a function unit that executes camera functions, wherein: as a function of the camera is executed, the function unit transmits information related to the executed function to the battery pack; and the battery unit has a storage unit in which the information related to the camera function is stored.

According to the 9th aspect of the invention, in the camera according to the 8th aspect, it is preferred that: the function unit accumulates information related to the camera functions and transmits the accumulated information related to the camera functions to the battery unit; and the storage unit stores therein the accumulated information related to the camera functions having been transmitted.

According to the 10th aspect of the invention, in the camera according to the 8th aspect, it is preferred that: the storage unit accumulates the information related to the camera function transmitted thereto and stores therein the accumulated information.

According to the 11th aspect of the invention, a camera having loaded therein a battery unit that includes a battery and a first storage unit, which operates on power supplied from the battery unit, comprises: a function unit that executes a plurality of functions of the camera; a control unit; and a second storage unit, wherein: the second storage unit stores therein cumulative information indicating a value that accumulate as a function is engaged; and the control unit transmits to and stores into the first storage unit the cumulative information in the second storage unit as a first function is engaged, and then resets the cumulative information at the second storage unit; the control unit reads the cumulative information stored in the first storage unit of the battery unit from the battery unit as a second function is engaged; the control unit obtains a sum of the cumulative information having been read and cumulative information stored in the second storage unit after resetting; and the control unit uses the sum of the cumulative information thus obtained as new cumulative information to be transmitted to the battery unit.

According to the 12th aspect of the invention, in the camera according to the 11th aspect, it is preferred that: the control unit reads the cumulative information from the first storage unit as a function to be engaged first is engaged and transmits the cumulative information to the first storage unit as a function to be engaged last is engaged.

According to the 13th aspect of the invention, in the camera according to the 11th aspect, it is preferred that: a plurality of functions include at least one of an image photographing function, a monitor display function, a light emitting illumination function, an AF function and a zoom function; and the cumulative information includes at least one of a number of images that are photographed, an accumulated time length of monitor display device ON time, a number of times light has been emitted for illumination, an accumulated length of AF operation time and an accumulated length of zoom operation time.

According to the 14th aspect of the invention, a camera that operates on power supplied from a battery unit loaded therein having a chargeable secondary battery, a measurement unit that measures remaining battery power value in the secondary battery and a first storage unit in which the remaining battery power value is stored, comprises: a function unit that executes a plurality of functions of the camera; a control unit; a second storage unit; and a display unit, wherein: the second storage unit stores therein cumulative information indicating values that accumulate as the functions are engaged; the control unit transmits to and stores into the first storage unit the cumulative information as a first function is engaged, and then resets the cumulative information at the second storage unit; the control unit reads the remaining battery power value and the cumulative information from the battery unit as a second function is engaged; the control unit reads the remaining battery power value as each of the plurality of functions is engaged, displays the remaining battery power value thus read at the display unit, and obtains a sum of the cumulative information having been read and cumulative information stored in the second storage unit; the control unit uses the sum of the cumulative information thus obtained as new cumulative information to be transmitted to the battery unit.

According to the 15th aspect of the invention, a camera system comprises: a battery unit having a chargeable secondary battery, a measurement unit that measures remaining battery power value in the secondary battery and a first storage unit in which the remaining battery power value is stored; a camera that operates on power supplied from the battery unit loaded therein; and a charge apparatus that charges the secondary battery of the battery unit, wherein: the camera includes a function unit that executes a plurality of functions of the camera, a control unit, a second storage unit, and a display unit; the second storage unit stores therein cumulative information indicating values that accumulate as the functions are engaged; the control unit reads the remaining battery power value as each of the functions is engaged and displays the remaining battery power value thus read at the display unit; the control unit reads the cumulative information stored in the first storage unit as one of the functions is engaged; the control unit obtains a sum of the cumulative information having been read and the cumulative information stored in the second storage unit; the control unit transmits the sum to the battery unit for storage and also resets the cumulative information at the second storage unit as another function is engaged; and the charge apparatus resets the cumulative information stored in the first storage unit when the secondary battery in the battery unit has been charged.

According to the 16th aspect of the invention, an electronic apparatus system comprises: a battery unit having a chargeable secondary battery, a measurement unit that measures remaining battery power value in the secondary battery and a first storage unit in which the remaining battery power value is stored; an electronic apparatus that operates on power supplied from the battery unit loaded therein; and a charge apparatus that charges the secondary battery of the battery unit, wherein: the electronic apparatus includes a function unit that executes a plurality of functions of the electronic apparatus, a control unit, a second storage unit, and a display unit; the second storage unit stores therein information that is altered as the functions are engaged; the control unit reads the information stored in the first storage unit as one of the functions is engaged; the control unit generates the information with new content based upon the information having been read and the information stored in the second storage unit; the control unit transmits the information with new content to the battery unit for storage and also resets the information in the second storage unit as another function is engaged; and the charge apparatus resets the information stored in the first storage unit when the secondary battery in the battery unit has become charged.

BRIEF DESCRIPTION OF THE DRAWINGS

FIGS. 2A and 2B show the timing with which the camera main body and the secondary battery unit communicate with each other;

FIG. 3 presents an example of a battery information display;

FIG. 5 shows the structure adopted in the charger used to charge the secondary battery unit;

FIG. 15 presents an example of a display which may be brought up at the monitor display unit to indicate the numbers of pictures that may be taken in correspondence to various photographing conditions.

DESCRIPTION OF PREFERRED EMBODIMENTS

First Embodiment

The first embodiment in which the present invention is adopted in an electronic still camera is now explained. It is to be noted that the present invention may be adopted in all types of devices and apparatuses that operate on secondary batteries (rechargeable batteries).

Figure 1:
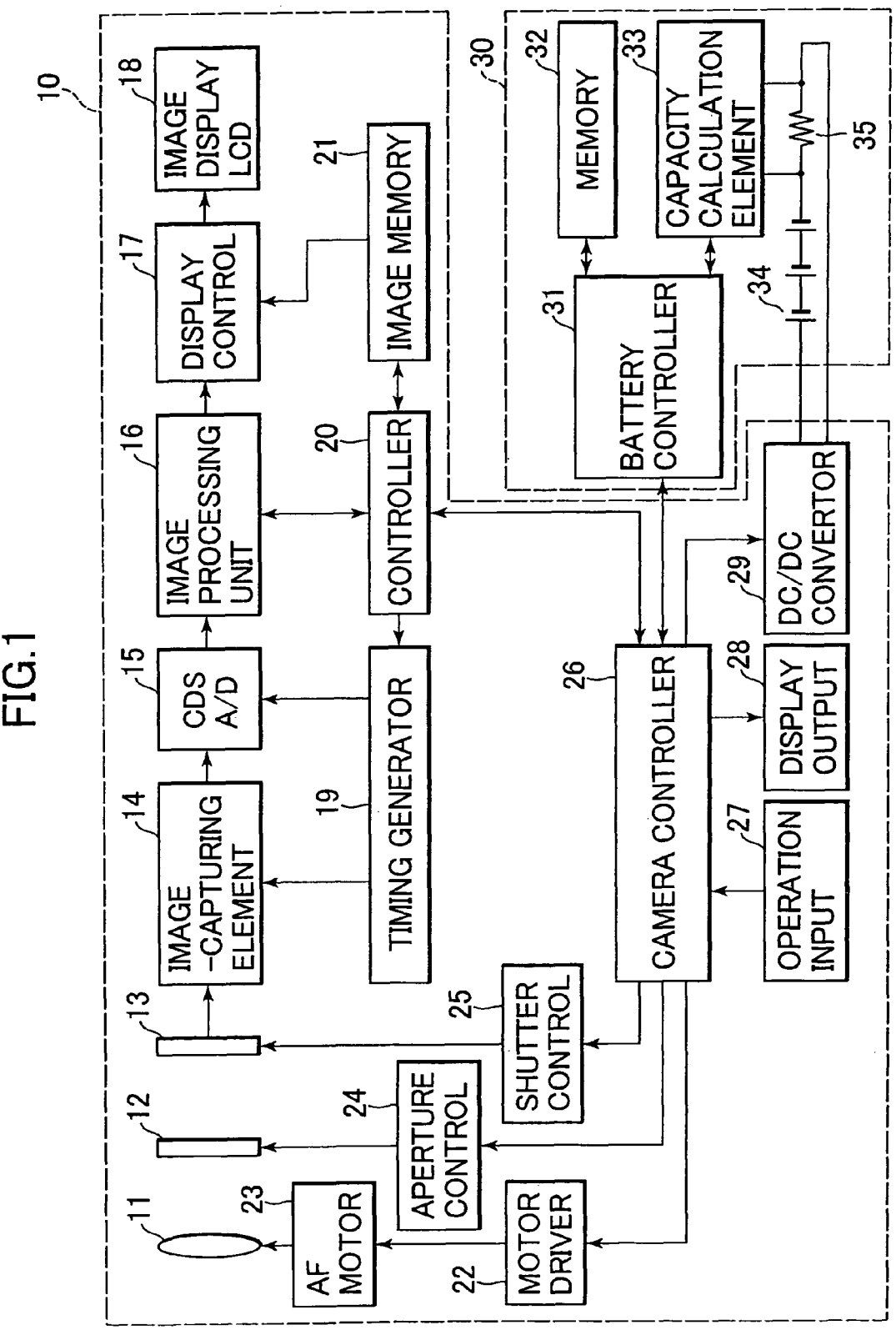
FIG. 1 shows the structure of the electronic still camera achieved in a first embodiment.

FIG. 1 shows the structure of the electronic still camera achieved in the embodiment. A secondary battery unit 30 is mounted at a camera main body 10. The secondary battery unit 30 is a detachable unit that can be freely attached to or detached from the camera main body 10. The camera main body 10 includes a photographic lens 11, an aperture 12, a shutter 13, an image-capturing element 14, a CDS·A/D conversion unit 15 that converts the output from the image-capturing element 14 to digital values through correlated double sampling, an image processing unit 16, a display control unit 17 that implements control to display a captured image, an image display LCD 18, a timing generator that controls the timing with which the image-capturing element 14 and the CDS·A/D conversion unit 15 are engaged in operation, a controller 20 that controls the devices and circuits in the image-capturing system, an image memory 21 in which image data are recorded, a motor driver 22, an AF motor 23 that drives a focusing lens at the photographic lens 11, an aperture control actuator 24, a shutter control actuator 25, a camera controller 26 that controls the devices and circuits in the photographic system, an operation input unit 27 through which operations such as the shutter release operation are input, a display output unit 28 utilized to display exposure information and the like, a DC/DC converter 29 that generates a voltage needed at the camera and the like.

The secondary battery unit 30 includes a battery controller 31 that monitors the consumed battery capacity, the charged battery capacity and the like, a memory 32 in which a cumulative value indicating a camera use status, the consumed battery capacity, the charged battery capacity and the like are stored, a capacity calculation element 33 that measures the consumed battery capacity and the charged battery capacity, battery cells 34, a resistor 35 that detects the consumption current and the charge current at the battery and the like.

As the secondary battery unit 30 is mounted at the camera main body 10, the battery cells 34 of the secondary battery unit 30 become connected with the DC/DC converter 29 at the camera main body 10 via the resistor 35 and also, the battery controller 31 and the camera controller 26 become connected with each other via a communication line.

In the case of an electronic still camera, the term "camera use statuses" refers to the statuses of camera operations that need power from the battery unit 30, such as the number of shutter releases, the length of time over which the power has been in an ON state (the length of time over which the camera has been in use), the length of time over which the photographic lens has been engaged in focusing operation and the length of time over which images have been displayed. At least one of such camera use statuses, e.g., the number of shutter releases, is provided from the camera controller 26 to the battery controller 31 in a predetermined cycle. At the battery controller 31, a cumulative value calculated by using the use statuses having been received is stored in the memory 32 and the calculated value indicating the use status is transmitted to the camera controller 26.

At the secondary battery unit 30, the capacity calculation element 33 detects the consumption current and calculates the battery capacity being consumed. As the current, i.e., the consumption current being used at the camera main body 10, which flows from the battery cells 34 to the DC/DC converter 29 of the camera main body 10, passes through the resistor 35, a voltage (=consumption current×resistance value) is generated at the two ends of the resistor 35 in proportion to the consumption current. Since the capacity of a battery is normally indicated in units of (mAH) and is defined as the length of time over which the battery is capable of continuously supplying a specific current, the consumption current can be detected by measuring the voltage level at the two ends of the resistor 35, and the battery capacity being consumed at the camera main body 10 can be ascertained through a time integration of the consumption current. The consumed battery capacity detected by the capacity calculation element 33 is stored into the memory 32 via the battery controller 31.

The camera controller 26 at the camera main body 10 and the battery controller 31 at the secondary battery unit 30 engage in data communication over a predetermined cycle, as shown in FIGS. 2A and 2B. The use status of the camera main body 10 explained earlier is transmitted from the camera main body 10 to the secondary battery unit 30 over a specific cycle, as shown in FIG. 2A. The use status transmitted from the camera main body 10 to the secondary battery unit 30 over the specific cycle through the data communication is a value corresponding to the time between the preceding use status transmission and the present use status transmission. For instance, if the number of shutter releases is transmitted as the use status, the use status indicates the number of shutter releases having been performed between the preceding transmission and the present transmission.

The battery controller 31 adds the use status transmitted from the camera main body 10 to the secondary battery unit 30 to the use status cumulative value stored in the memory 32 which was calculated at the time of previous use status reception. If the number of shutter releases has been received as the use status, for instance, the most recently received number of shutter releases is added to the shutter release cumulative value stored in the memory 32 calculated at the time of the previous reception.

After information such as the use status is transmitted from the camera main body 10 to the secondary battery unit 30, the secondary battery unit 30 executes processing such as the calculation of the cumulative value indicating the cameras use status and the calculation of the consumed battery capacity, and once the processing is completed, the secondary battery unit 30 transmits information such as the use status cumulative value to the camera main body 10. The information transmitted from the secondary battery unit 30 to the camera main body 10 includes the use cumulative value stored in the memory 32, the consumed capacity calculated at the secondary battery unit 30 and the charged capacity of the secondary battery unit 30.

The term "charged capacity" used with respect to the secondary battery unit 30 refers to the full charged capacity of the secondary battery unit 30, which may be the rated capacity of the battery cells 34 or may be indicated by a value obtained by lowering the rated capacity in correspondence to the extent to which the charge capacity of the battery cells becomes reduced due to battery degradation occurring over time.

For instance, if a value "2" indicating the number of shutter releases is transmitted from the camera main body 10 to the secondary battery unit 30 during a communication 1, a value "3" is transmitted during a communication 2, a value "0" is transmitted during a communication 3 and a value "2" is transmitted during communication 4 in FIGS. 2A and 2B, a shutter release cumulative value of 2 is transmitted from the secondary battery unit 30 to the camera main body 10 during a communication 1', a shutter release cumulated value of 5 is transmitted during a communication 2', a shutter release cumulative value 5 is transmitted during a communication 3' and a shutter release cumulative value of 7 is transmitted during a communication 4'.

The cycle over which the camera main body 10 and the secondary battery unit 30 engage in communication with each other on a regular basis is normally several seconds. However, some use statuses may be sustained over longer periods of time than the communication cycle. For instance, the power ON state (length of time over which the camera remains in use) may last over 10 seconds up to several tens of seconds. If a use status that is likely to be sustained over a much longer time than the regular communication cycle is transmitted through the regular communication, a cumulative error may occur. For this reason, a use status such as the power ON time likely to last longer than the regular communication cycle may be transmitted over a longer interval than the regular communication cycle, or it may be transmitted when the power is turned off.

As a battery information display request as issued through the operation input unit 27, the camera controller 26 at the camera main body 10 displays information with regard to the secondary battery unit 30, such as that shown in FIG. 3, based upon the use status cumulative value, the consumed battery capacity and the full charged capacity received from the secondary battery unit 30. A battery use quantity is displayed as the ratio (%) of the consumed capacity to the full charged capacity in a bar graph. In the example presented in FIG. 3, the ratio of the consumed capacity to the full charged capacity is indicated as the use quantity in a bar graph, together with a numerical value "35%".

The shutter release cumulative value "253 frames" and the cumulative power ON time, i.e., the use time, "35 min 40 sec" corresponding to 35% to which extent the battery has been used after the fully charged secondary battery unit 30 was mounted at the camera main body 10, are indicated as use statuses.

Since the battery information in FIG. 3 indicates the number of times the shutter has been released in the camera, "253 frames", and the use time "135 min 40 sec", corresponding to a battery use quantity "35%" to which extent the fully charged battery has become consumed at the present time point, the user can correlate the actual performance, i.e., 253 frames of photographed images and over 35 minutes of use, to the battery use quantity of 35%. Then, based upon the camera use records (work records) corresponding to the battery use quantity representing the extent to which the fully charged battery has become consumed to the present level, the user can easily estimate the number of frames of images that can be photographed (the work volume) and the length of time over which the camera can be engaged in use on the remaining 65% of the battery power. In other words, by adopting the embodiment, it becomes possible to judge with ease how many more frames of images can be photographed and how much longer the camera can be used in operation.

Figure 4A:
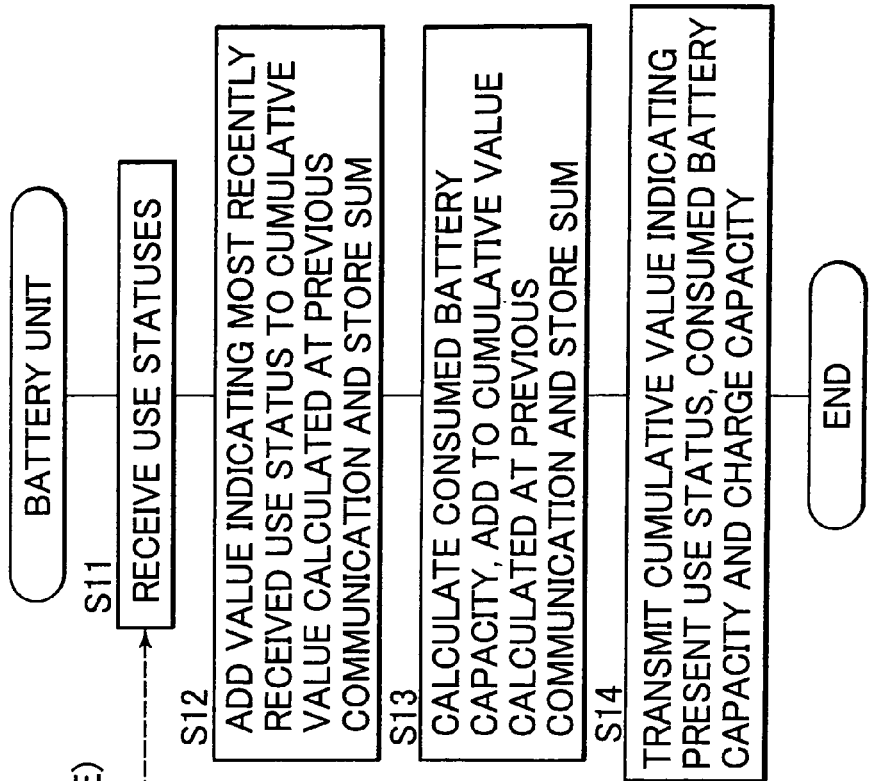
FIGS. 4A and 4B present flowcharts of the battery information display processing executed at the camera main body and the secondary battery unit.
Figure 4B:
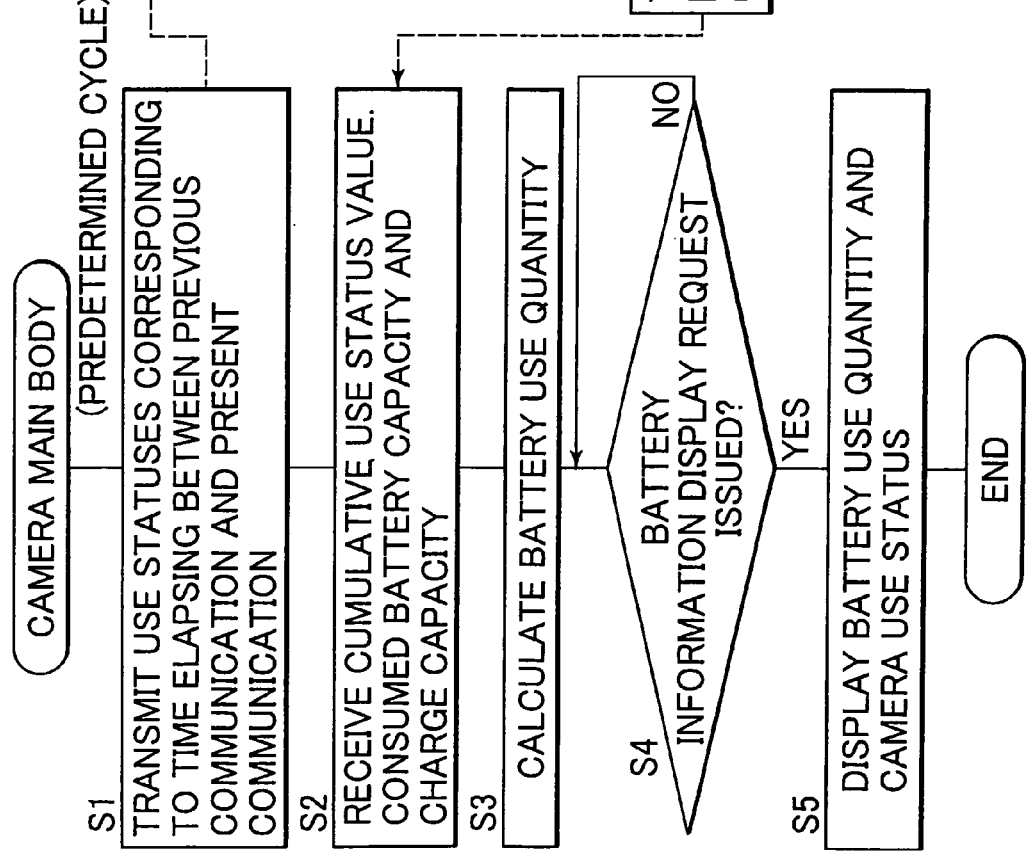

FIGS. 4A and 4B presents flowcharts of the processing executed at the camera main body 10 and the secondary battery unit 30 over the predetermined cycle. In reference to these flowcharts, the operations executed at the camera main body 10 and the secondary battery unit 30 in the embodiment are explained.

The camera controller 26 at the camera main body 10 executes the processing in FIG. 4A over the predetermined cycle. In step S1, a camera use status corresponding to the time elapsing between the previous communication and the present communication with the secondary battery unit 30, e.g., the number of shutter releases, is transmitted to the secondary battery unit 30.

The battery controller 31 at the secondary battery unit 30 executes the processing in FIG. 4B upon receiving the camera use status from the camera main body 10. After receiving the camera use status corresponding to the time elapsing between the previous communication and the present communication in step S11, the operation proceeds to step S12 to add the most recently received use status to the use status cumulative value stored into the memory 32 at the time of the previous communication with the camera main body 10 and stores the sum into the memory 32, thereby updating the use status cumulative value.

In the following step S13, the consumed battery capacity indicating the battery capacity having been used over the time elapsing between the previous communication and the present communication is calculated in the method explained earlier. Then, the most recently calculated consumed capacity is added to the consumed capacity value stored in the memory 32 at the time of the previous communication and the sum is stored into the memory 32, thereby updating the consumed capacity. In step S14, the present camera use status cumulative value, the consumed battery capacity and the full charged capacity are read out from the memory 32 and are transmitted to the camera main body 10.

In step S2, the camera controller 26 at the camera main body 10 receives the present camera use status cumulative value, the consumed battery capacity and the full charged capacity from the secondary battery unit 30. In the following step S3, the ratio of the present consumed battery capacity to the battery full charged capacity is calculated to determine the battery use quantity. In step S4, a verification is executed to as certain whether or not a request to display the information related to the secondary battery unit 30 has been issued through the operation input unit 27, and the operation proceeds to step S5 if it is determined that a display request has been issued.

In step S5, the battery use quantity, i.e., the ratio of the consumed capacity to the full charged capacity is indicated with a bar graph and a numerical value (%). In addition, camera use statuses (work records), i.e., the number of shutter releases and the use time (the power ON time) in this example, indicating how the camera has been engaged in operation since the fully charged battery unit 30 was mounted at the camera main body 10 up to the current point, are indicated, as shown in FIG. 3.

Next, an explanation is given on how the secondary battery unit 30 is charged. FIG. 5 shows the secondary battery unit 30 connected to a charger 40. The charger 40 includes a power circuit 41 which charges the battery cells 34 at the secondary battery unit 30 and also supplies power to the charger 40 itself by rectifying an AC source voltage, an indicator device 42 such as an LED that indicates a charge state, a charge controller 43 that manages charge operations by communicating with the battery controller 31 at the secondary battery unit 30 and an AC plug 44 through which the connection with the AC source is achieved.

At the secondary battery unit 30 is connected to the charger 40 and the AC plug 44 is connected to and AC source socket (not shown), a charge of the battery cells 34 starts. The charge current flowing from the power circuit 41 at the charger 40 to the battery cells 34 at the secondary battery unit 30 flows through the resistor 35, thereby generating a voltage (=charge current×resistance value) in proportion to the level of the charge current at the two ends of the resistor 35. Thus, as in the measurement of the consumed capacity as explained earlier, the charge current can be detected by measuring the voltage at the two ends of the resistor 35 while charging the secondary battery unit 30 and the charged capacity at the battery cells can be ascertained through time integration of the charge current. The charged capacity of the battery cells 34 detected by the capacity calculation element 33 is transmitted to the charge controller 43 of the charger 40 via the battery controller 31, and the charge controller 43 manages the charge of the secondary battery unit 30 by controlling the power circuit 41 based upon the charged capacity.

As the secondary battery unit 30 is connected to the charger 40, the charge controller 43 outputs a use status clear command to the memory 32 of the battery controller 31. Upon receiving the use status clear command, the battery controller 31 resets the use status cumulative values indicating the number of shutter releases and the length of power ON time stored in the memory 32 to 0. It is to be noted that the use status cumulative values stored in the memory 32 may be reset when the battery controller 31 detects that the secondary battery unit 30 has been connected to the charger 40, instead.

The charge controller 43 makes a decision as to whether or not the secondary battery cells 34 have been charged to a fully charged state based upon the charged capacity value transmitted from the battery controller 31, and once the secondary battery cells 34 are determined to be in a fully charged state, the operation of the power circuit 41 is stopped to end the charge operation and the completion of the charge operation is indicated at the indicator device 42. The decision as to whether or not the battery cells have been charged to a fully charged state may be made by ascertaining whether or not the charged capacity has become equal to the consumed capacity. Alternatively, the battery cells may be determined to be in a fully charged state when the charge current has become equal to or smaller than a predetermined value.

Upon the charge completion, the charge controller 43 outputs a consumed capacity clear command to the battery controller 31 so as to clear the consumed capacity value stored in the memory 32. Upon receiving the consumed capacity clear command, the battery controller 31 resets the consumed capacity value stored in the memory 32 to 0. It is to be noted that by assuming that the battery cells are to be charged to the fully charged state once the secondary battery 30 is connected to the charger 40, the consumed capacity value in the memory 32 may be reset automatically for convenience as the secondary battery unit 30 becomes connected to the charger 40.

Figure 6:
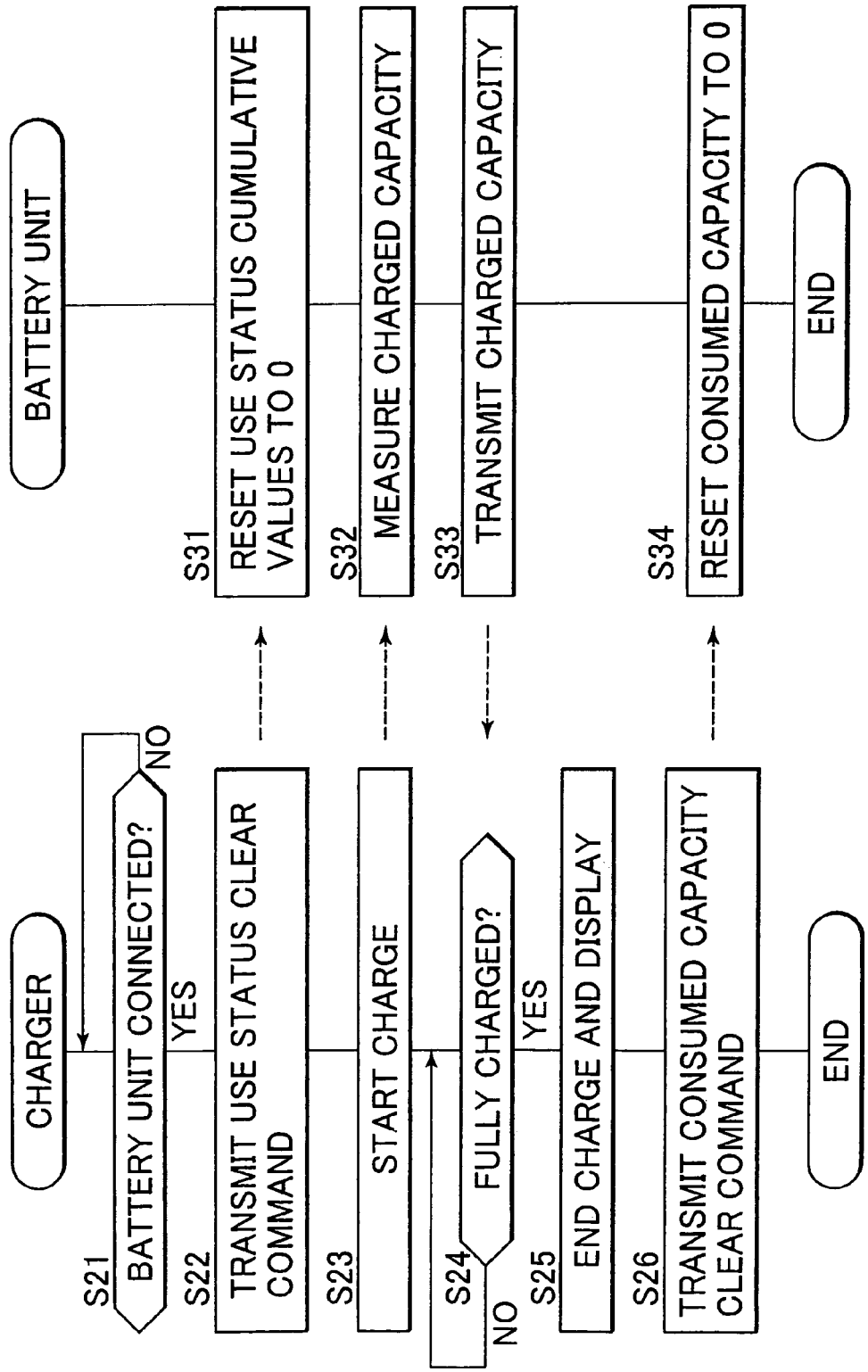
FIG. 6 presents flowcharts of the charge processing executed at the charger and the secondary battery unit.

FIG. 6 presents flowcharts of the charge operation executed to charge the secondary battery unit. The right side of FIG. 6 shows the processing executed at the charge controller 43 of the charger 40, whereas the left side of FIG. 6 shows the processing executed at the battery controller 31 of the secondary battery unit 30.

The charge controller 43 at the charger 40 makes a decision in step S21 as to whether or not the secondary battery unit 30 has been connected. The secondary battery unit 30 is judged to be connected to the charger 40 if an attempted communication with the battery controller 31 is enabled. Once the secondary battery unit 30 is determined to be connected to the charger 40, the use status clear command is transmitted to the battery controller 31 in step S22.

Upon receiving the use status clear command from the charge controller 43, the battery controller 31 of the secondary battery unit 30 resets the use status cumulative values stored in the memory 32 to 0 in step S31.

The charge controller 43 starts charging the battery cells 34 by starting up the power circuit 41 in step S23. As the charge operation starts, the battery controller 31 starts measuring the charged capacity with the capacity calculation element 33 in step S32, and in the following step S33, it transmits the charged capacity ascertained through the measurement to the charge controller 43. It is to be noted that the charged capacity may be measured over predetermined intervals.

In step S24, the charge controller 43 makes a decision as to whether or not the battery cells 34 have entered a fully charged state based upon the charged capacity value transmitted from the battery controller 31. Once it is confirmed that the battery cells have been charged to the fully charged state, the operation proceeds to step S25 to end the charge executed by the power circuit 41 and the charge completion is indicated at the indicator device 42. Then, in step S26, the consumed capacity clear command is transmitted to the battery controller 31.

Upon receiving the consumed capacity clear command from the charge controller 43, the battery controller 31 resets the consumed capacity value stored in the memory 32 to 0 in step S34.

Since the use status cumulative values and the consumed capacity value stored in the memory 32 at the secondary battery unit 30 are reset to 0 every time the secondary battery unit 30 is charged as described above, the measurement of the use status cumulative value and consumed capacity can start anew for a fully charged secondary battery unit 30 with the full charged capacity after the fully charged secondary battery unit 30 is mounted at the camera main body 10 upon a charge completion, thereby enabling detection of accurate battery information.

As explained above, in the embodiment, the use quantity representing the extent to which the battery has been consumed from the fully charged state to the present state relative to the full charged capacity, i.e., the ratio of battery use and the work volume (the operation volume) with which the camera has been engaged in operation from the fully charged state to the present state are indicated. As a result, it is possible to judge with ease and accuracy how much more use the user can expect out of the camera at the present rate of use, i.e., how many more frames of images can be photographed and how much longer the camera can be used. Namely, the user can as certain with ease and accuracy the available work (operation) volume and work (operation) time remaining in an apparatus operating on a secondary battery.

In addition, since the consumed battery capacity and the camera use status cumulative values (apparatus work volume) are stored in the secondary battery unit 30, accurate battery information can be indicated even when the secondary battery unit 30 having been taken out of the camera is reloaded at the camera.

Furthermore, since the consumed battery capacity and the camera use status cumulative values (apparatus work volume) stored at the secondary battery unit 30 are reset to 0 when the secondary battery unit 30 is charged, accurate battery information can be detected and indicated.

It is to be noted that an explanation is given above in reference to the embodiment by assuming that the battery cells 34 are charged to the fully charged state during the charge operation and that the charge capacity value transmitted from the secondary battery unit 30 to the camera main body 10 is the full charged capacity. However, as the consumed capacity is stored in the memory 32 of the secondary battery unit 30 and the exact charged capacity the extent to which the battery cells have been charged can be ascertained during the charge operation, the accurate charged battery capacity can be determined even when the charge operation is halted before the battery cells become fully charged for some reason, by first subtracting the consumed capacity from the full charged capacity achieved through the previous charge operation, thereby ascertaining the remaining battery capacity, and then by adding the charged capacity achieved through the present charge operation to the remaining battery capacity. In such a case, the ratio of the consumed capacity to the charged capacity at the secondary battery unit 30 at the time of the interrupt in the charge operation should be ascertained to be indicated with a bar graph and a numerical value (%) at the camera main body 10. Since the use quantity relative to the charge capacity of the battery unit 30 loaded at the camera after the charge operation interrupt and the camera use statuses (the camera work volume) indicating how the camera has been engaged in operation on the power supplied from the secondary battery unit 30 mounted at the camera following the interrupt in the charge operation can be indicated even when the charged capacity does not match the full charged capacity, the user can judge with ease and accuracy how much use he will get out of the camera at the present rate of use, i.e., how many more pictures he can take and how much longer he can use the camera.

Alternatively, if the charge operation is interrupted before the battery cells become fully charged, the charged capacity having been achieved by the time of the charge interrupt may be subtracted from the consumed capacity stored in the memory 32 of the secondary battery unit 30 so as to determine the ratio of the battery use as the consumed capacity relative to the full charged capacity as in the embodiment described earlier.

In the embodiment described above, the consumed battery capacity value is transmitted from the secondary battery unit 30 to the camera main body 10. Instead, the remaining battery capacity may be determined by subtracting the consumed capacity from the charge capacity, and the remaining capacity and the charged capacity may be transmitted to the camera main body 10. In addition, while an explanation is given above in reference to the embodiment on an example in which the ratio of the battery use is calculated at the camera main body 10 based upon the consumed battery capacity and the charge capacity, this ratio of battery use may instead be calculated at the battery unit 30 and the results of the calculation may be provided to the camera main body 10.

In the embodiment described above, the number of photographic frames and the length of use time (the length of power ON time) are indicated as values indicating the work volume that the camera has handled. As explained earlier, the level of power consumption in a camera varies depending upon the specific type of operation it is engaged in, i.e., depending upon the operating mode. For instance, more power is required in the photographing mode in which a photographing operation is executed while displaying an image at the monitor or in a reproduction mode in which a photographed image is reproduced at the monitor than in a regular photographing mode in which an image is photographed without displaying the image at the monitor. When indicating the length of time over which the camera has been engaged in operation after loading a charged battery into the camera, individual lengths of camera operation time may be indicated separately in correspondence to the mode in which much power needs to be consumed such as a monitor image display mode, and the regular photographing mode so as to allow the user to ascertain how much time the camera has been engaged in operation in each specific operating mode. As a result, it becomes possible to judge with ease and accuracy how long the camera can be used in the operation that the user is planning to perform on the camera.

When the individual lengths of camera or apparatus operation time are indicated for the different operating modes, each operating mode should be classified in correspondence to the specific level of power requirement and use status, i.e. the use time, in the operating mode should be transmitted to the battery unit from the camera or the apparatus so as to enable the battery unit to calculate the cumulative values representing the accumulated length of use time for each operating mode. Then, the length of use corresponding to the individual operating modes are transmitted from the battery unit to the camera or the apparatus, at which the battery use quantity indicating the extent to which the battery has been used since it was loaded in a charged state (the ratio of the consumed capacity relative to the charge capacity), and the lengths of time over which the camera or the apparatus has been engaged in operation in the various operating modes are displayed.

By adopting the embodiment described above, it becomes possible to allow the user to ascertain with ease and accuracy the remaining work volume and the remaining work time available in an apparatus that operates on a battery.

Second Embodiment

Figure 7A:
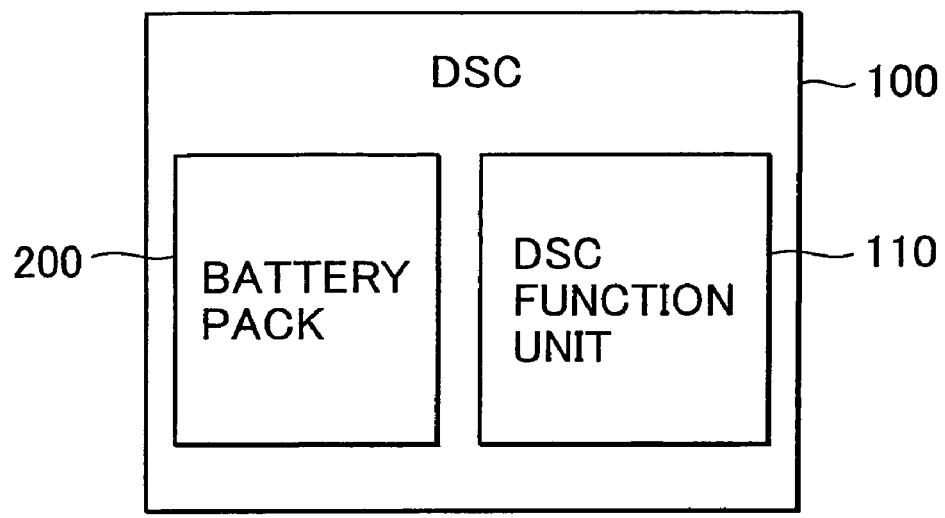
FIGS. 7A and 7B schematically illustrate the system configuration adopted in a second embodiment.
Figure 7B:
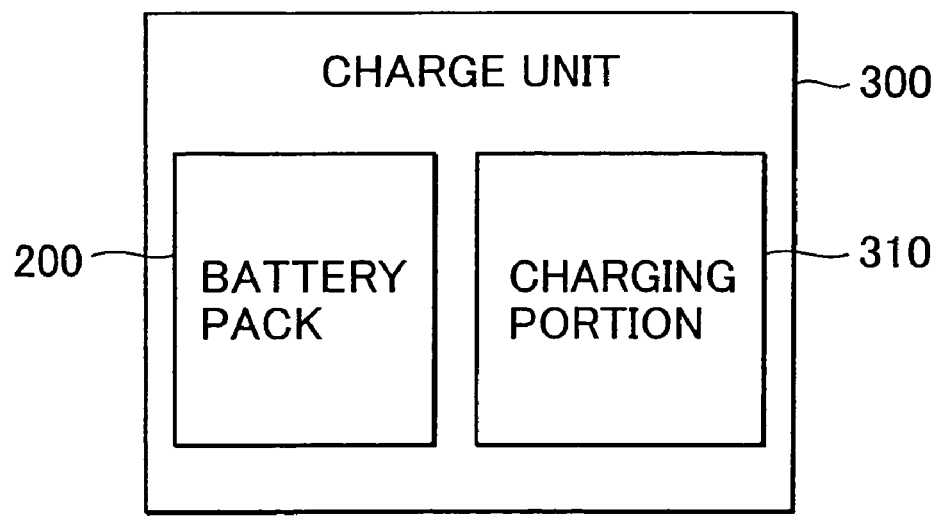

FIGS. 7A and 7B are schematic block diagrams of structures that may be adopted in the second embodiment of the present invention. Reference numeral 100 in FIG. 7A indicates a digital camera (hereafter referred to as a DSC), with reference numeral 110 indicating a DSC function unit that captures a subject image. Reference numeral 200 indicates a battery pack (battery unit) loaded into the DSC 100 to supply power to the DSC function unit 110. Reference numeral 300 in FIG. 7B indicates a charge unit used to charge the battery pack 200. A charging portion 310 of the charge unit 300 charges the mounted battery pack 200. The battery pack 200 is taken out of the DSC 100 and is mounted at the charge unit 300.

Figure 8:
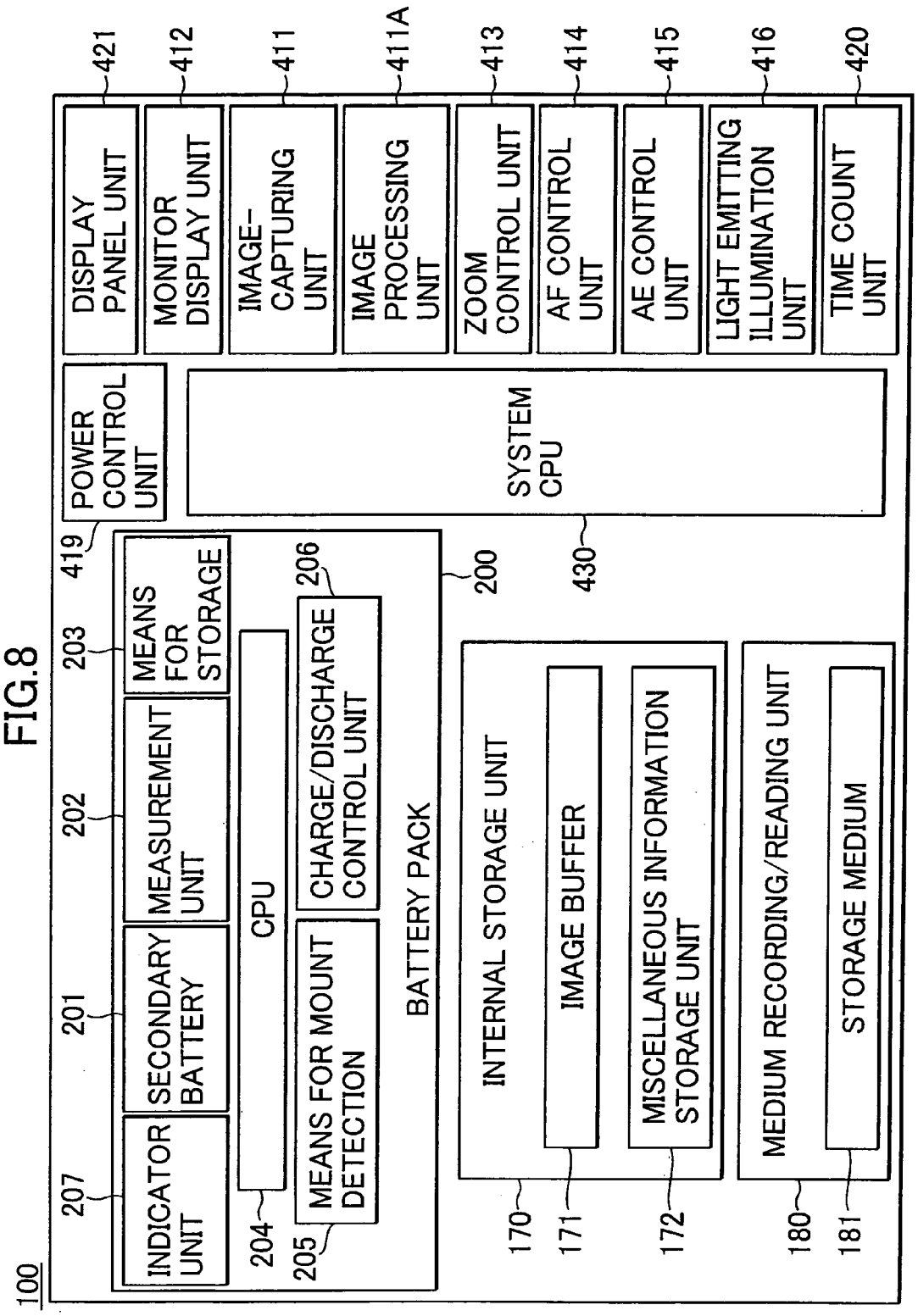
FIG. 8 shows the structure of the DSC.

FIG. 8 shows in detail the structure adopted in the DSC 100. The structural features other than those included in the battery pack 200 constitute the DSC function unit 110. The DSC function unit 110 comprises an image-capturing unit 411, an image processing unit 411A, a monitor display unit 412, a zoom control unit 413, an AF control unit 414, an AE control unit 415, a light emitting illumination unit 416, an internal storage unit 170, a medium recording/reading unit 180, a power control unit 419, a time count unit 420, a display panel unit 421, a system CPU (hereafter referred to as a CPU) 430 that is connected with the individual components and controls the various components and the like. The image-capturing unit 411 includes a photographic optical system having an aperture, a shutter, a focusing mechanism, a zoom mechanism and the like, an image-capturing element and the like. The image processing unit 411A generates images by processing signals provided by the image-capturing unit 411. The image processing unit 411A generates a display image to be displayed at the monitor display unit 412 and a recording image to be recorded into the medium recording/reading unit 180. The power control unit 419 controls the power supply from the battery pack 200 to the individual components. The CPU 430 sets the DSC 100 in a photographing mode, a reproduction mode or the like, in correspondence to the setting at the mode selector dial (not shown) at the DSC 100. The DSC 100 further includes a grounded electrical terminal at the area where the battery pack 200 is mounted.

The DSC 100 displays a display image generated by the image processing unit 411A at the monitor display unit 412 in the photographing mode. This display image may be the image currently captured by the image-capturing element or an image which has already been photographed. The former is used as a viewfinder image during a photographing operation. The latter image is displayed immediately after the photographing operation either automatically or in response to a specific DSC operation, and the display screen is switched back to the former image display in response to a specific operation. The latter image is used to check the photographing results.

The zoom control unit 413 implements control on the drive of the zoom mechanism in response to an operation of a zoom switch (not shown) by the photographer to adjust the magnification factor of the subject image captured at the image-capturing element. The AF control unit 414 adjusts focus on the subject by controlling the drive of the focusing mechanism. The AE control unit 415 measures the brightness of the subject and sets an aperture value and a shutter speed that will achieve the desired exposure quantity in conformance to the measured brightness level. The light emitting illumination unit 416 emits light and illuminates the subject when extra light is needed to achieve the desired exposure based upon the photometering results obtained at the AE control unit 415.

The internal storage unit 170 includes an image buffer 171 and a miscellaneous information storage unit 172. The miscellaneous information storage unit 172 is constituted of a nonvolatile memory. In the image buffer 171, a recording image generated by the image processing unit 411A in response to a photographing operation executed in the DSC 100 is temporarily stored. The medium recording/reading unit 180 records the photographed image temporarily stored in the image buffer 171 into a detachable storage medium 181 loaded therein. In the miscellaneous information storage unit 172, various conditions set at the DSC 100, e.g., basic setting conditions, photographing function conditions and reproduction function conditions are stored.

The basic setting conditions include, for instance, the ON/OFF setting for the operation sound, the auto power OFF time setting with which the power is automatically turn off when no operation has been performed over a specific length of time, the brightness setting for the monitor display unit 412 and the ON/OFF settings for displaying various types of information at the monitor display unit 412.

The photographing function conditions include, for instance, the monitor display ON/OFF setting, the single AF mode/continuous AF mode, the multiple area photometering/spot photometering/centralized photometering setting, the automatic light emission/forced light emission/no light emission for light emitting illumination, the image quality mode and the recording data size, the white balance condition and the monitor display ON/OFF setting for remaining battery power display. It is to be noted that in the single AF(S-AF) mode, an autofocus operation is executed only while the shutter button is pressed halfway down, whereas an autofocus operation is executed at all times while the photographing mode is in effect in the continuous AF (C-AF) mode. The multiple area photometering/spot photometering/centralized photometering setting is selected to enable the AE control unit to execute a photometering operation in a specific method. The image quality mode and the recording image size are set to determine specific image processing conditions under which the image processing unit 411A generates a recording image, e.g., the image compression rate and the image size.

The various conditions stored in the miscellaneous condition storage unit are each selected from options corresponding to a given function condition. The control unit 430 photographs an image in the photographing mode or displays a photographic image in the reproduction mode by controlling the various components in conformance to the individual function condition settings stored in the miscellaneous information storage unit 172.

In addition, one of the options corresponding to each condition is stored in the miscellaneous information storage unit 172 as an initial basic setting condition, an initial photographing function condition or an initial reproduction function condition.

The time count unit 420 is capable of individually counting the lengths of different types of continuous time periods and various accumulated time lengths each representing a cumulative value of a plurality of time periods corresponding to a given type.

The DSC 100 reads out an image recorded in the storage medium 181 and displays the image thus read out at the monitor display unit 412 in the reproduction mode.

The battery pack 200 includes a secondary battery 201, a measurement unit 202, a means for storage 203, a CPU 204, a charge/discharge control unit 206 and an indicator unit 207. The secondary battery 201 is a rechargeable battery which may be, for instance, a lithium ion battery, a nickel hydrogen battery or a nickel cadmium battery. In the means for storage 203, information indicating the remaining battery power (rated value) when the secondary battery 201 is in a fully charged state, the remaining battery power at the end of a charge operation, the remaining battery power currently available in the battery (hereafter may be simply referred to as the remaining battery power) and the like is stored. The CPU 204 to which the measurement unit 202, the means for storage 203, the charge/discharge control unit 206 and the indicator unit 207 are connected, is driven by the secondary battery 201. The measurement unit 202 measures the voltage and the current output from the secondary battery 201 or the voltage and the current input to the secondary battery 201, as well as the battery temperature.

The CPU 204, which also functions as part of the measurement unit 202, calculates the quantity of electricity flowing out from the secondary battery 201 based upon the output voltage and the output current, calculates the quantity of electricity flowing into the secondary battery 201 based upon the input voltage and the input current, determines a new value indicating the remaining battery power, i.e., the quantity of electricity that can be output subsequently, based upon the present value of the remaining battery power stored in the means for storage 203 and the quantities of electricity outflow/inflow, and updates the remaining battery power at the means for storage 203 with the new value for the remaining battery power. The remaining battery power is calculated by incorporating a temperature compensation based upon the battery temperature measured by the measurement unit 202, since the remaining battery power value increases as the battery temperature rises and decreases as the battery temperature falls. In addition, the ratio of the current remaining battery power to the remaining battery power when the secondary battery 201 is in the fully charged state, i.e., the charge rate, is determined to update the outstanding charge rate stored in memory.

The charge/discharge control unit 206 starts/stops the power supply from the secondary battery 201 to the outside and a charge of the secondary battery 201 in response to commands issued from the CPU 204.

At the indicator unit 207, the state of the battery pack 200 and the like are indicated in response to a command from the CPU 204. The state of the battery pack 200 includes the remaining battery power and the charge rate mentioned earlier.

The battery pack 200 further includes a means for mount detection 205 that is utilized to detect the apparatus into which the battery pack 200 is mounted. The means for mount detection 205 has an electrical terminal which is connected to an electrical terminal of the apparatus at which the battery pack 200 is mounted and detects the potential at the electrical terminal. Based upon the detected potential, the CPU 204 detects the apparatus into which the battery pack 200 has been loaded. The grounded electrical terminal at the DSC 100 is connected to the electrical terminal of the means for mount detection 205.

The CPU 204 at the battery pack 200 and the CPU 430 at the DSC 100 into which the battery pack 200 is mounted exchange various types of information. The CPU 430 obtains the information indicating the remaining battery power stored at the means for storage 203 via the CPU 204 and displays the obtained information at the display panel unit 421. Depending upon the display condition set at the DSC 100, the information may also be displayed at the monitor display unit 412. The information displayed at the monitor display unit 412 may be superimposed over a display image.

Figure 9:
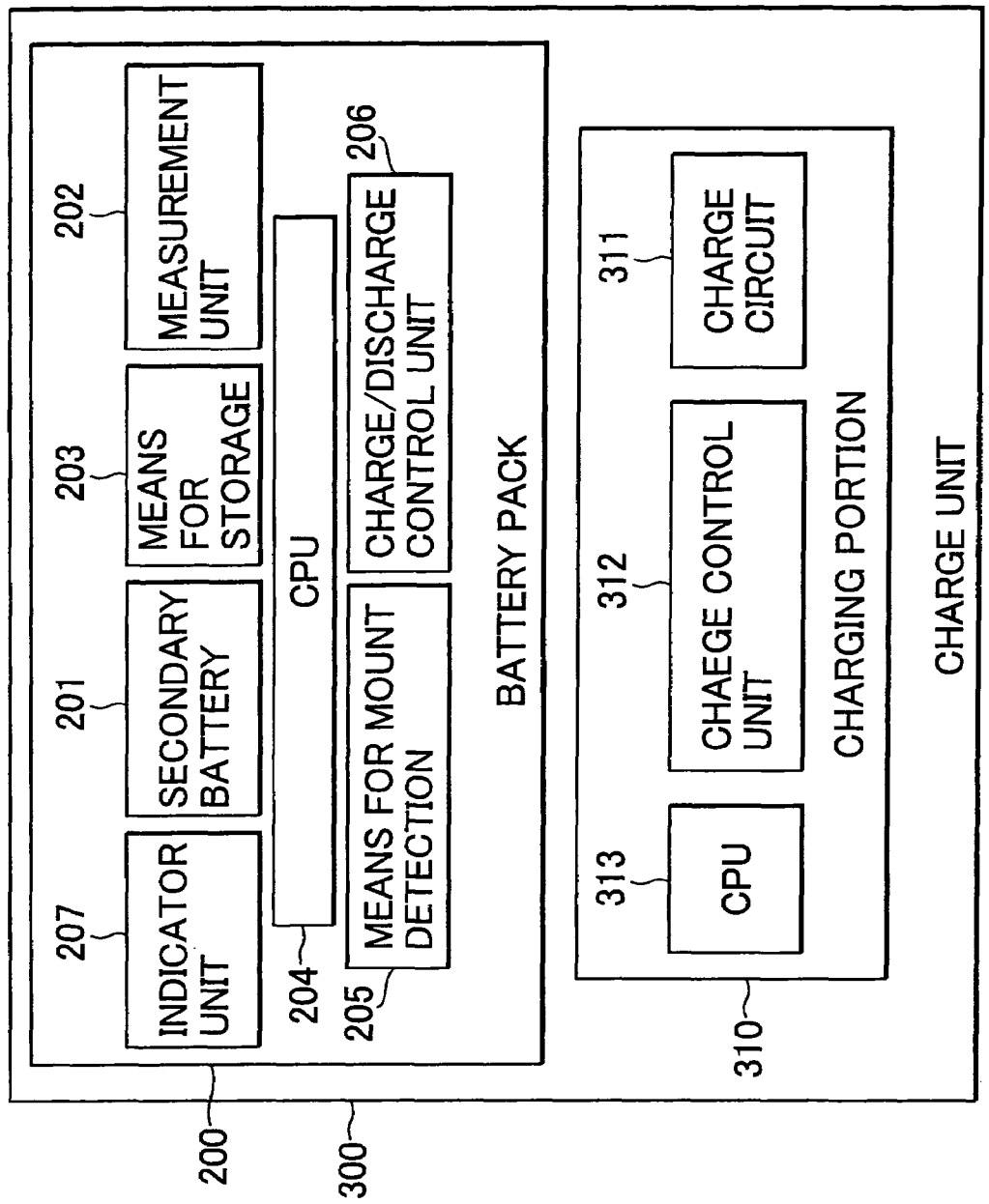
FIG. 9 shows the structure of the charge unit.

FIG. 9 shows in detail the charge unit 300. The charging portion 310 at the charge unit 300 includes a charge circuit 311, a charge control unit 312 and a CPU 313. The CPU 313 issues commands for the charge control unit 312 to control the charge circuit 311 and also exchanges various types of communication with the CPU 204 at the battery pack 200 mounted at a specific position of the charge unit 300. The battery pack 200 mounted at the specific position of the charge unit 300 is charged by the charging portion 310. The charge circuit 311 receives power from a commercial source and supplies a voltage/current suitable for charging the secondary battery 201 to the battery pack 200. The charge control unit 312 includes an electrical terminal which is connected to the electrical terminal of the means for mount detection 205 at the battery pack 200 mounted at the charge unit 300. A predetermined level of potential is achieved at the electrical terminal of the charge control unit 312.

The CPU 204 of the battery pack 200 constantly monitors the electrical potential at the electrical terminal of the means for mount detection 205 over a predetermined cycle. If the detected potential is 0 V, the CPU 204 judges that the battery pack is mounted in the DSC 100, whereas it judges that the battery pack 200 is mounted at the charge unit 300 if the detected potential is at the predetermined level. If no potential is detected, the CPU 204 judges that the battery pack 200 is not mounted at any apparatus. If the battery pack 200 is judged to be loaded in the DSC 100, the CPU 204 issues a command for the charge/discharge control unit 206 to start power supply from the secondary battery 201. To be more precise, the actual power supply starts when the power switch at the DSC 100 is turned on. If the battery pack 200 is judged to be mounted at the charge unit 300, the CPU 204 issues a command for the charge/discharge control unit 206 to enable a charge of the secondary battery 201. Since the detection and judgment are executed constantly, the CPU 204 is able to sense a disengagement of the battery pack from the apparatus at which the battery pack 200 has been mounted, as well. Then, its stores the remaining battery power at the time of the disengagement into the means for storage 203 as the remaining battery power at the charge end. Subsequently, it issues a command for the charge/discharge control unit 206 to cut off the terminal used for power supply/charge from the internal circuits of the battery pack 200, thereby disabling the power supply/charge. As a result, it is possible to prevent shorting.

Figure 10:
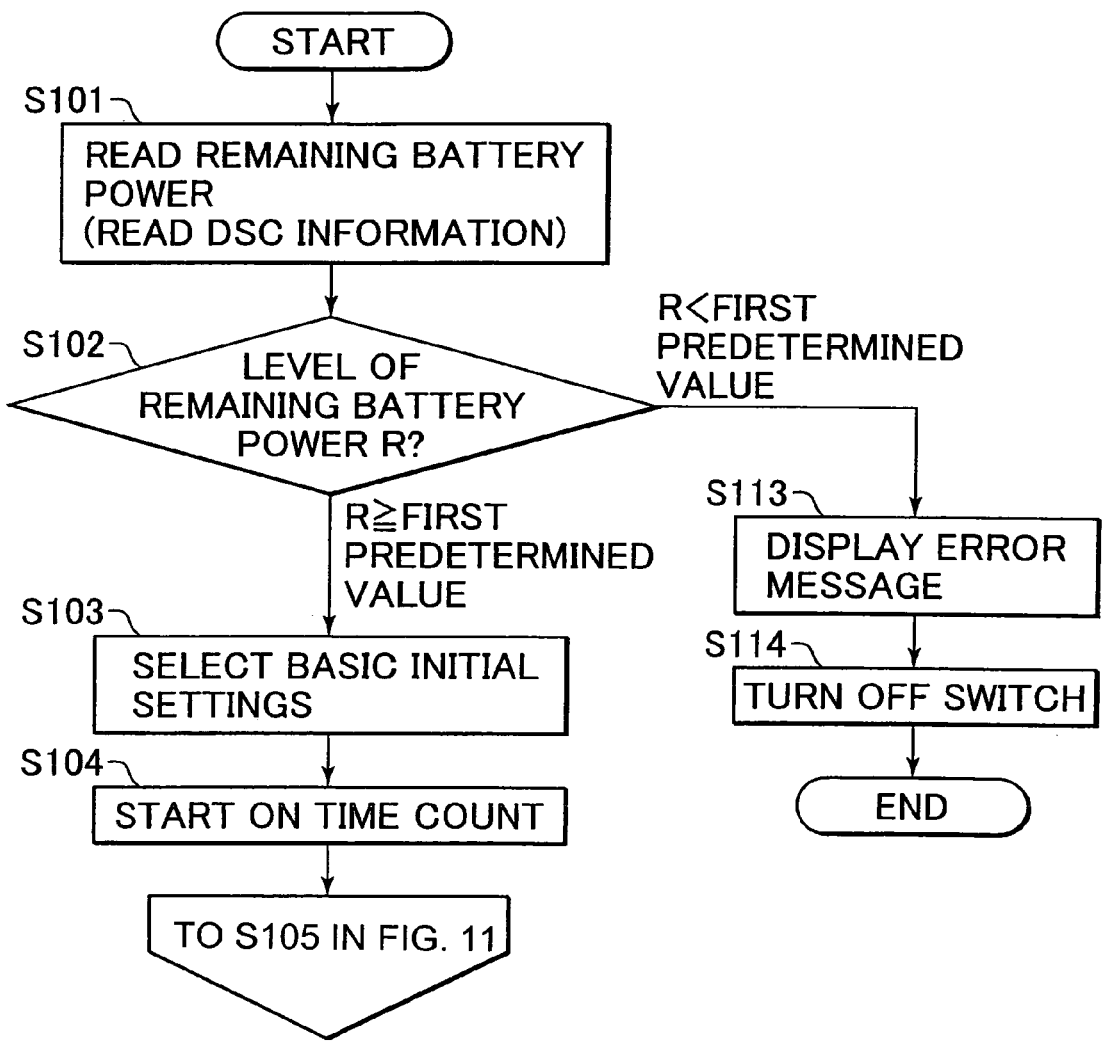
FIG. 10 presents the first half of the flowchart of the operational procedure at the DSC.
Figure 11:
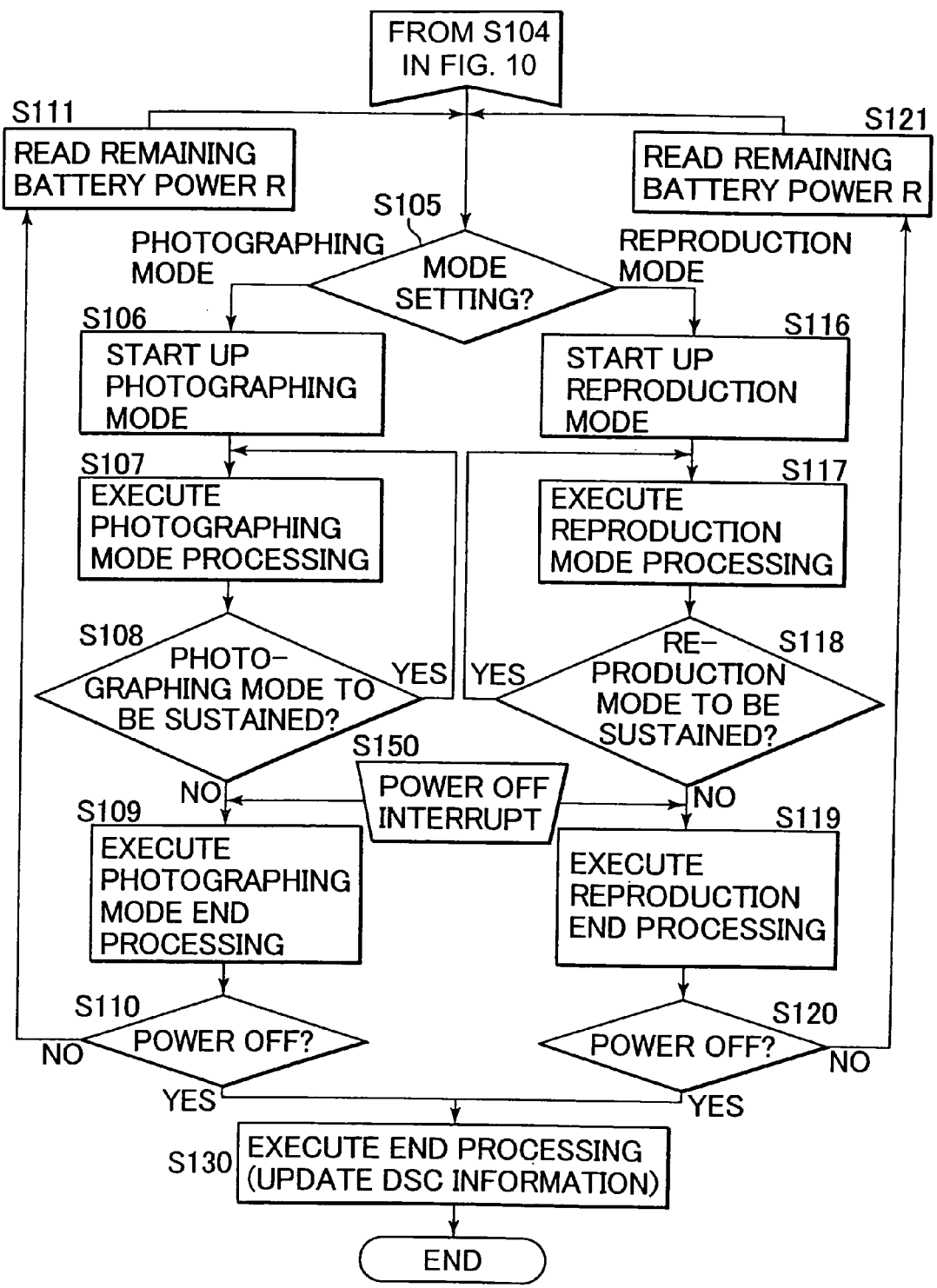
FIG. 11 presents the second half of the flowchart of the operational procedure at the DSC.

Next, the internal operation of the DSC 100 is explained by focusing on the processing executed by the CPU 430. FIGS. 10 and 11 present a flowchart of the processing executed at the CPU 430. While the procedure shown in FIG. 10 and the procedure shown in FIG. 11 are both part of a single procedural sequence, they are presented in two separate drawings for convenience. The explanation is first given in reference to FIG. 10. The processing in FIG. 10 starts as the power switch at the DSC 100 is turned on.

In step S101, the remaining battery power R is read from the means for storage 203 at the battery pack 200. At the same time, the remaining battery power at the charge end is also read and stored into the miscellaneous information storage unit 172. If a value representing the remaining battery power is already stored in the miscellaneous information storage unit 172, the value is updated. It is to be noted that the read of the DSC information indicated inside the parentheses of step 101 is to be explained in detail later.

In step S102, a decision is made as to whether or not the remaining battery power R having been read is equal to or greater than a first predetermined value at which at least some of the functions of the DSC 100 can be engaged in operation. If it is decided that the remaining battery power R is equal to or greater than the first predetermined value, the operation proceeds to step S103, whereas the operation proceeds to step S113 if the remaining battery power is determined to be less than the first predetermined value. After an error message such as "insufficient battery power" is displayed over a predetermined length of time in step S113, the power switch is turned off in step S114 and then the processing ends.

In step S103, the various components of the DSC 100 are set to the basic initial settings. The basic initial setting conditions stored in the miscellaneous information storage unit 172 are used as the basic initial settings. A basic initial setting condition selected as an initial setting of the DSC 100 can be altered by performing a specific operation at the DSC 100. Then, by performing a further specific operation, the basic initial setting condition stored in the miscellaneous information storage unit 172 is updated to the new condition setting.

In step S104, the time count unit 420 starts a first time count. In the first time count, the time count unit 420 measures the length of time over which the DSC 100 is engaged in operation (the DSC operation time). The time count of the DSC operation time continues until the power switch of the DSC 100 is turned off. A further explanation is given in reference to FIG. 11.

In step S105, the mode having been set through the mode selector dial which is operated to select an operating mode for the DSC 100 is judged and the operation proceeds to execute the processing corresponding to the specific mode setting. For instance, if the photographing mode has been set in the DSC, the operation proceeds to step S106, whereas if the reproduction mode has been set, the operation proceeds to step S116.

In step S106, the DSC 100 is started up in the photographing mode. The processing executed in step S106 is to be described in detail later.

In step S107, the DSC 100 executes photographing mode processing, i.e., it executes the various functions needed to photograph images in response to a DSC operation performed by the photographer.

In step S108, a decision is made as to whether or not the photographing mode is to be sustained. If the photographing mode is still set at the mode selector dial, the photographing mode is judged to be still in effect and accordingly, the operation returns to step S107 to continue with the photographing mode processing. If, on the other hand, it is decided that the photographing mode is no longer in effect, the operation proceeds to step S109. It is judged that the photographing mode is no longer in effect if the mode selector dial setting has been changed to another mode, e.g., the reproduction mode.

In step S109, photographing mode end processing is executed. Processing similar to that executed to exit the photographing mode in a DSC in the related art is executed as the photographing mode end processing. Since the details of this processing are of the known art, their explanation is omitted. It is to be noted that if the power switch of the DSC 100 is turned off in the photographing mode, the processing in step S109 is executed in response to an interrupt command 50 generated and input in response to the power OFF.

In step S110, a decision is made as to whether or not the power switch has been turned off, i.e., whether or not the interrupt command 50 has been input. If an interrupt command has been input, the operation proceeds to step S130 to execute end processing similar to that executed in DSCs in the related art and turn off the power. Otherwise, the operation returns to step S105 after reading the remaining battery power R in step S111, to engage in startup processing for the mode newly selected through the mode selector dial. For instance, if the setting at the mode selector dial has been switched to the reproduction mode, the operation proceeds to step S116.

If, on the hand, it is judged in step S105 that the reproduction mode is set at the mode selector dial, the DSC 100 is started up in the reproduction mode in step S116. The processing executed in step S116 is to be described in detail later.

In step S117, the DSC 100 executes the reproduction mode processing, i.e., it executes various functions related to photographic image reproduction in response to a DSC operation performed by the photographer.

In step S118, a decision is made as to whether or not the reproduction mode is to be sustained. If the mode selector dial is still set at the reproduction mode, it is judged that the reproduction mode is to be sustained, and the operation returns to step S117 to continuously execute the reproduction mode processing. If, on the other hand, it is judged that the reproduction mode is no longer in effect, the operation proceeds to step S119. It is judged that the reproduction mode is no longer in effect if the setting at the mode selector dial has been switched to another mode such as the photographing mode.

In step S119, reproduction mode end processing is executed. Processing similar to that executed to exit the reproduction mode in a DSC in the related art is executed as the reproduction mode end processing. Since the details of this processing are of the known art, their explanation is omitted. It is to be noted that if the power switch of the DSC 100 is turned off in the reproduction mode, the processing in step S119 is executed in response to an interrupt command 50 generated and input in response to the power OFF.

In step S120, a decision is made as to whether or not the power switch has been turned off. If the power switch is judged to have been turned off, the operation proceeds to step S130 to execute end processing by turning off the power. The end processing is to be described in detail later. Otherwise, after reading the remaining battery power R in step S121, the operation returns to step S105 to execute startup processing for the new mode selected with the mode selector dial. For instance, if the photographing mode has been selected with the mode selector dial, the operation proceeds to step S106.

Figure 12:
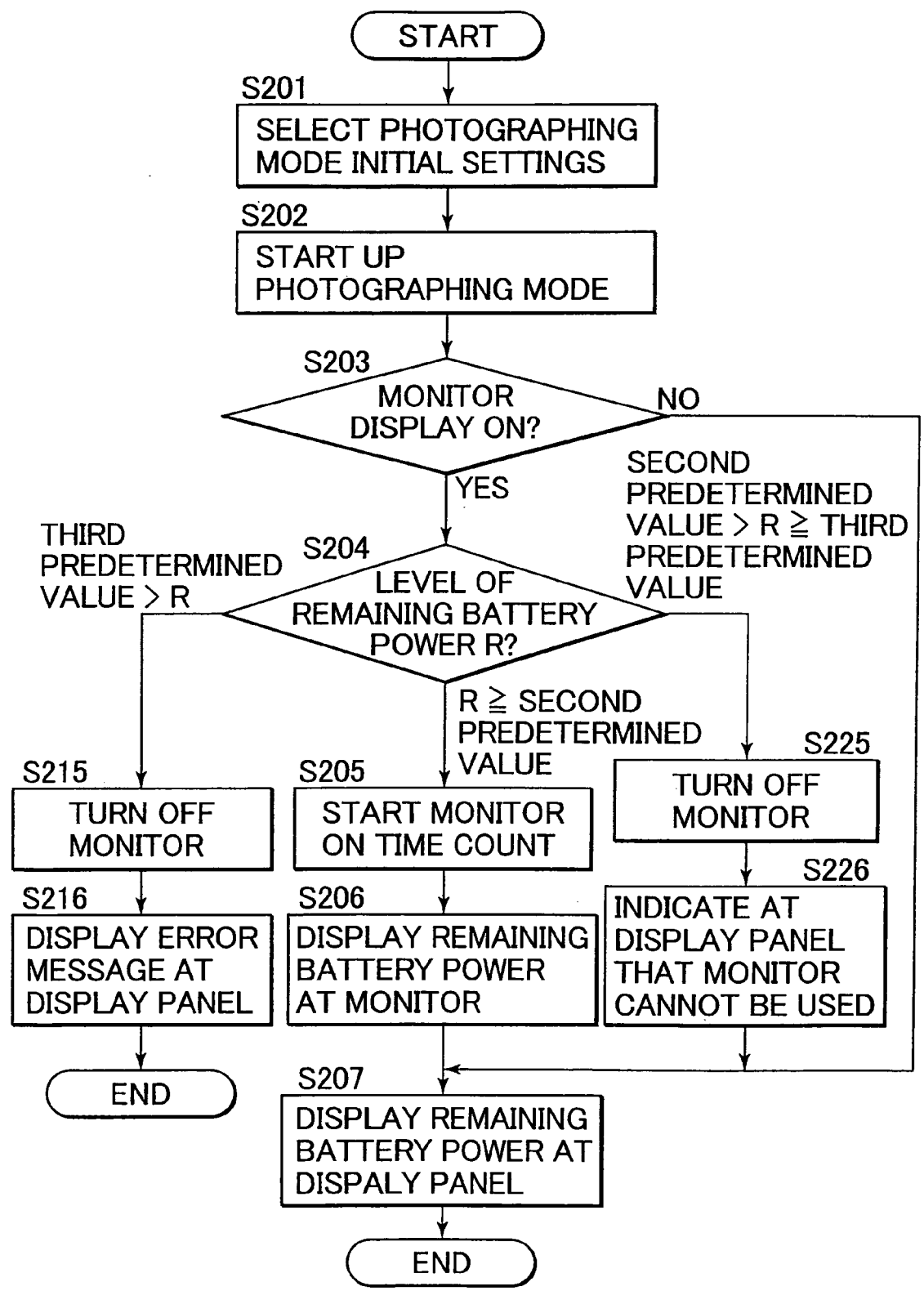
FIG. 12 presents a flowchart of the photographing mode startup processing.
Figure 13:
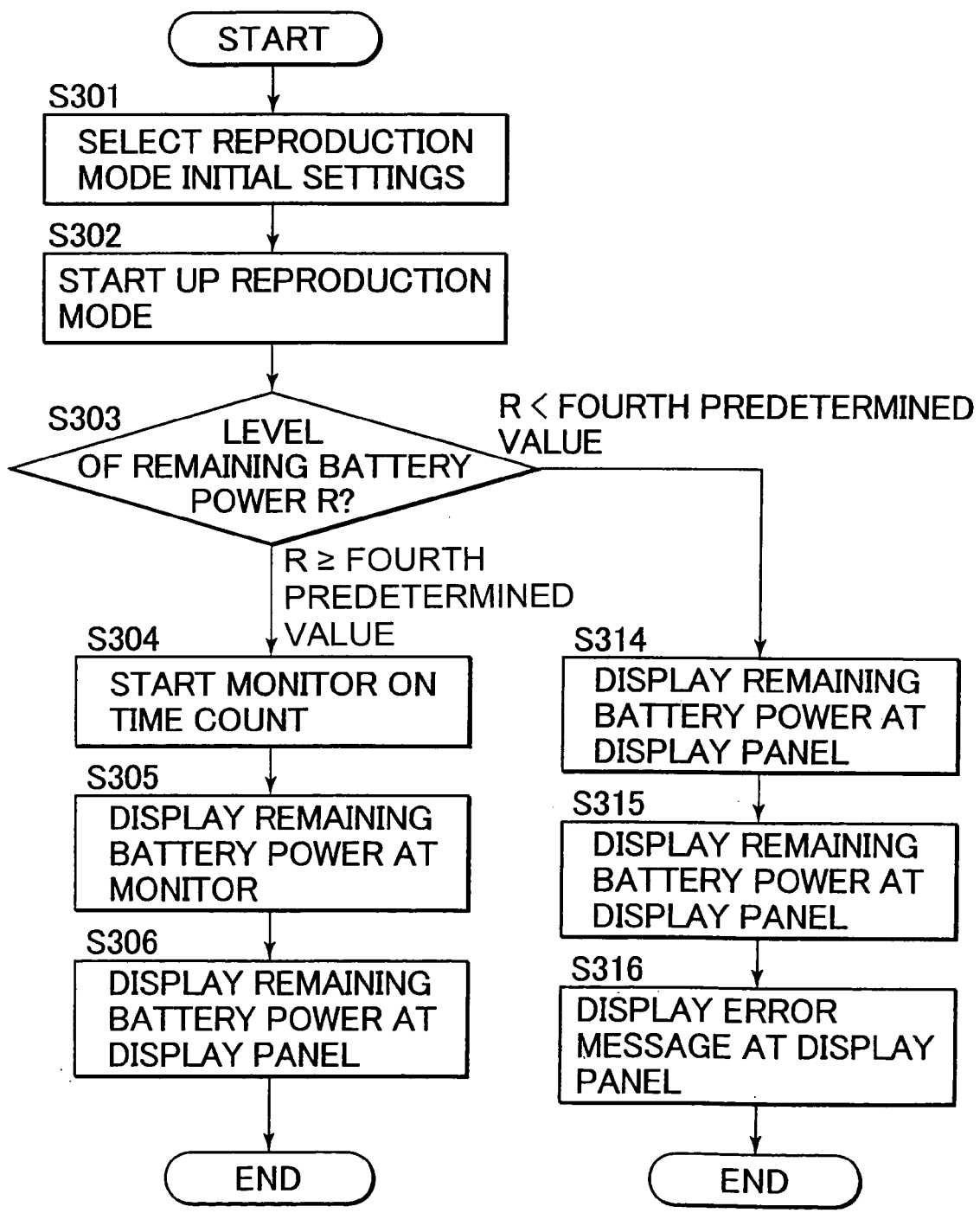
FIG. 13 presents a flowchart of the reproduction mode startup processing.

The procedure of the photographing mode startup processing executed in step S106 and the procedure of the reproduction mode startup processing executed in step S116 are respectively shown in FIGS. 12 and 13.

It is to be noted that instead of or in addition to reading the remaining battery power in steps S111 and S121, the remaining battery power R may be read at the end of each type of processing or at the ends of certain types of processing executed in the photographing mode or the reproduction mode, which requires a great deal of battery power, e.g., photographing processing executed in response to a full-press operation of the shutter button and a light emission at the light emitting illumination unit 416 in the photographing mode, and display image selection processing in the reproduction mode. In such a case, a higher level of accuracy is achieved in the remaining battery power display which is to be explained in reference to FIGS. 12 and 13. Upon starting the photographing mode startup processing in FIG. 12 (step S106 in FIG. 11), the CPU 430 executes initial setting for photographing mode initialization in step S201. The initial photographing function conditions stored in the miscellaneous information storage unit 172 are used as the initial settings in the photographing mode. As explained earlier, the photographing function conditions include the monitor display ON/OFF setting, the single AF mode/continuous AF mode setting, the multiple area photometering/spot photometering/centralized photometering setting, the automatic light emission/forced light emission/no light emission setting for light emitting illumination, the image quality mode and the recording data size, the white balance condition and the monitor display ON/OFF setting for the remaining battery power display. In this example, the first option among the options for each condition distinguished from each other with a "/" is stored in the miscellaneous information storage unit 172 as the initial photographing function condition.

A given photographic function condition selected as an initial setting at the DSC 100 can be altered through a subsequent specific operation performed at the DSC 100 in the photographing mode. Then, by performing a further specific operation, the initial photographing function condition stored in the miscellaneous information storage unit 172 is updated to the new condition setting.

In step S202, the DSC 100 is started up in conformance to the photographing function conditions selected as the initial settings as explained above. At this time, the monitor display unit 412 is set in an ON state or an OFF state depending upon the monitor display unit ON/OFF condition which is one of the photographing function conditions and the remaining battery power R. Namely, a decision is made as to whether the monitor display unit ON setting or the monitor display unit OFF setting is currently selected. If the ON setting is in effect, the operation proceeds to step S204, whereas if the OFF setting is in effect, the operation proceeds to step S207.

In step S204, a decision is made based upon the remaining battery power R read in step S101 in FIG. 10 or in step S111 or step S121 in FIG. 11. The remaining battery power R read in step S111 or S121 in FIG. 11 is lower than the remaining battery power R read in step S101 in FIG. 10, since the battery power is further consumed in the DSC 100 between step S101 and step S111 or between step S101 and step S121.

The operation proceeds to step S205 if the remaining battery power R is equal to or greater than a second predetermined value indicating the battery power needed to photograph an image by engaging the monitor display unit 412, whereas the operation proceeds to step S225 if the remaining battery power R is less than the second predetermined value but it is equal to or greater than a third predetermined value indicating the battery power with which an image can be photographed as long as the monitor display unit 412 is not engaged to turn off the monitor display unit 412 and then a message indicating that the battery no longer has enough power to enable a photographing operation performed by engaging the monitor display unit 412 is brought up at the display panel unit 421 in step S226 before the operation proceeds to step S207. It is to be noted that the second predetermined value is larger than the first predetermined value mentioned earlier. If the remaining battery power R is determined to be less than the third predetermined value, the operation proceeds to step S215 to turn off the monitor display unit 412 and then, in step S216, an error message is displayed to indicate that a photographing operation is disabled due to insufficient battery power is displayed at the display panel unit 421 before the processing ends.

In step S205, the time count unit 420 starts a second time count. In the second time count, the accumulated length of time (accumulated monitor ON time) over which the monitor display unit 412 is engaged in operation (monitor ON time) is measured. The monitor ON time is measured (the monitor ON count is sustained) until the photographing mode ends or until the power switch of the DSC 100 is turned off. If the monitor display unit 412 is turned off in the photographing mode, the monitor ON count is halted, and then the time count is resumed as the monitor display unit 412 is turned on again so as to measure the accumulated monitor ON time.

As explained later, the length of time over which the monitor display unit is set in an ON state is also measured during the reproduction mode processing. The accumulated length of time over which the monitor display unit remains in an ON state includes the monitor ON time measured during the reproduction mode processing as well. Namely, the cumulative value represents the overall length of time over which the monitor is in an ON state after the power switch of the DSC 100 is turned on.

In step S206, the remaining battery power R is displayed at the monitor display unit 412.

In step S207, the remaining battery power R is displayed at the display panel unit 421.

After executing the photographing mode startup procedure described above, the photographing mode processing in step S107 in FIG. 11 is executed.

The photographing mode processing (executed in step S107 in FIG. 11) is now explained. During the photographing mode processing, processing similar to that executed during a photographing operation in a DSC in the related art is executed. While the processing which is of the known art is not explained in detail, an image captured by the image-capturing unit 411, for instance, is displayed in real time at the monitor display unit 412 during the photographing mode processing. This display image is used as a viewfinder image. If the monitor display OFF setting has been selected, the display image is not displayed.

As the shutter button (not shown) at the DSC is pressed halfway down, AF processing and photometering processing are respectively executed by the AF control unit 414 and the AE control unit 415, and in response to a full-press operation of the shutter button, photographing processing is executed. Namely, in response to a halfway press operation of the shutter button, the focus is adjusted onto the subject by the AF control unit 414, the AE control unit 415 sets the aperture and the shutter speed to values selected based upon the results of the photometering processing and light is emitted at the light emitting illumination unit 416 as necessary. In addition, a recording image together with a display image for reproduction and a thumbnail image corresponding to the recording image is generated at the image processing unit 411A by using the image photographed in response to a full-press operation of the shutter button, and the images are stored into the image buffer 171 and are also recorded into the recording medium 181 at the medium recording/reading unit 180. The recording image is an image having undergone processing executed at the image quality mode setting, the recording data size setting and the white balance condition setting selected as part of the photographing function conditions explained earlier. The reproduction display image is a small-size image generated in conformance to the performance level of the monitor display unit 412 and the thumbnail image is an even smaller image for thumbnail display.

It is to be noted that if the remaining battery power R is read at the end of each type of processing or at the ends of certain types of processing executed in the photographing mode processing or the reproduction mode processing, the processing in step S204 and subsequent steps in FIG. 12 or the processing in step S303 and subsequent steps in FIG. 13, too, should be executed each time the remaining battery power R is read.

Upon starting the reproduction mode startup processing in FIG. 13 (step S116 in FIG. 11), the CPU 430 executes initial setting for the initialization for the reproduction mode in step S301. The initial reproduction function conditions stored in the miscellaneous information storage unit 172 are used as the initial settings in the reproduction mode. The reproduction function conditions include the number of images to be brought up on display together in thumbnail image display and the length of time intervals over which a plurality of images are to be reproduced continuously, for example. An initial reproduction function condition selected as an initial setting at the DSC 100 can be altered by performing a subsequent specific operation performed at the DSC 100 in the reproduction mode. Then, by performing a further specific operation, the initial reproduction function condition stored in the miscellaneous information storage unit 172 is updated to the new condition setting.

In step S302, the DSC 100 is started up in conformance to the reproduction function conditions selected as the initial settings as explained above. At this time, the monitor display unit 412 is set in an ON state or an OFF state depending upon the remaining battery power R. Namely, in step S303, a decision is made as to whether or not the remaining battery power R read in step S101 in FIG. 10 or in step S111 or step S121 in FIG. 11 is equal to or greater than a fourth predetermined value indicating the battery power that enables the execution of the operation in the reproduction mode. The remaining battery power R read in step S111 or S121 in FIG. 11 is lower than the remaining battery power R read in step S101 in FIG. 10, since the battery power is further consumed in the DSC 100 between step S101 and step S111 or between step S101 step S121. The operation proceeds to step S304 if the remaining battery power is determined to be equal to or greater than the fourth predetermined value, whereas the operation proceeds to step S314 if it is judged to be less than the fourth predetermined value.

In step S304, the time count unit 420 starts a second time count, i.e., the time count of the accumulated length of monitor ON time. The monitor ON time is measured (the monitor ON count is sustained) until the reproduction mode ends or until the power switch of the DSC 100 is turned off.

As explained earlier, the length of time over which the monitor display unit remains in an ON state is also measured during the photographing mode processing. The accumulated length of time over which the monitor display unit is in an ON state includes the monitor ON time measured during the photographing mode processing, as well. Namely, the cumulative value represents the overall length of time over which the monitor is in an ON state after the power switch of the DSC 100 is turned on.

In step S305, the remaining battery power R is displayed at the monitor display unit 412.

In step S306, the remaining battery power R is displayed at the display panel unit 421.

By executing the reproduction mode startup procedure described above, the DSC 100 is set in a photographic image reproduction enabled state.

The following processing is executed if the remaining battery power R is judged to be less than the fourth predetermined value in step S303.

The monitor display unit 412 is turned off in step S314, and the remaining battery power R is displayed at the display panel unit 421 in step S315. In step S316, an error message indicating that the remaining battery power is insufficient is displayed before the processing ends.

Next, the reproduction mode processing (executed in step S117 in FIG. 11) is explained. During the reproduction mode processing, processing similar to that executed during a reproduction operation in a DSC in the related art is executed. While the processing which is of the known art is not explained in detail, an image recorded in the storage medium 181, for instance, is read out and displayed at the monitor display unit 412. At this time, the specific number of thumbnail images generated in correspondence to individual recording images, which number is set as a reproduction function condition, is displayed at once. The user is then prompted to select any image among the thumbnail images by performing a specific operation and then the reproduction image corresponding to the selected image is brought up on display. In addition, a flag indicating whether or not the recording image corresponding to the display image needs to be printed can be set. The photographing conditions under which the image on display was photographed and the like may be superimposed on the display as well.

Figure 14:
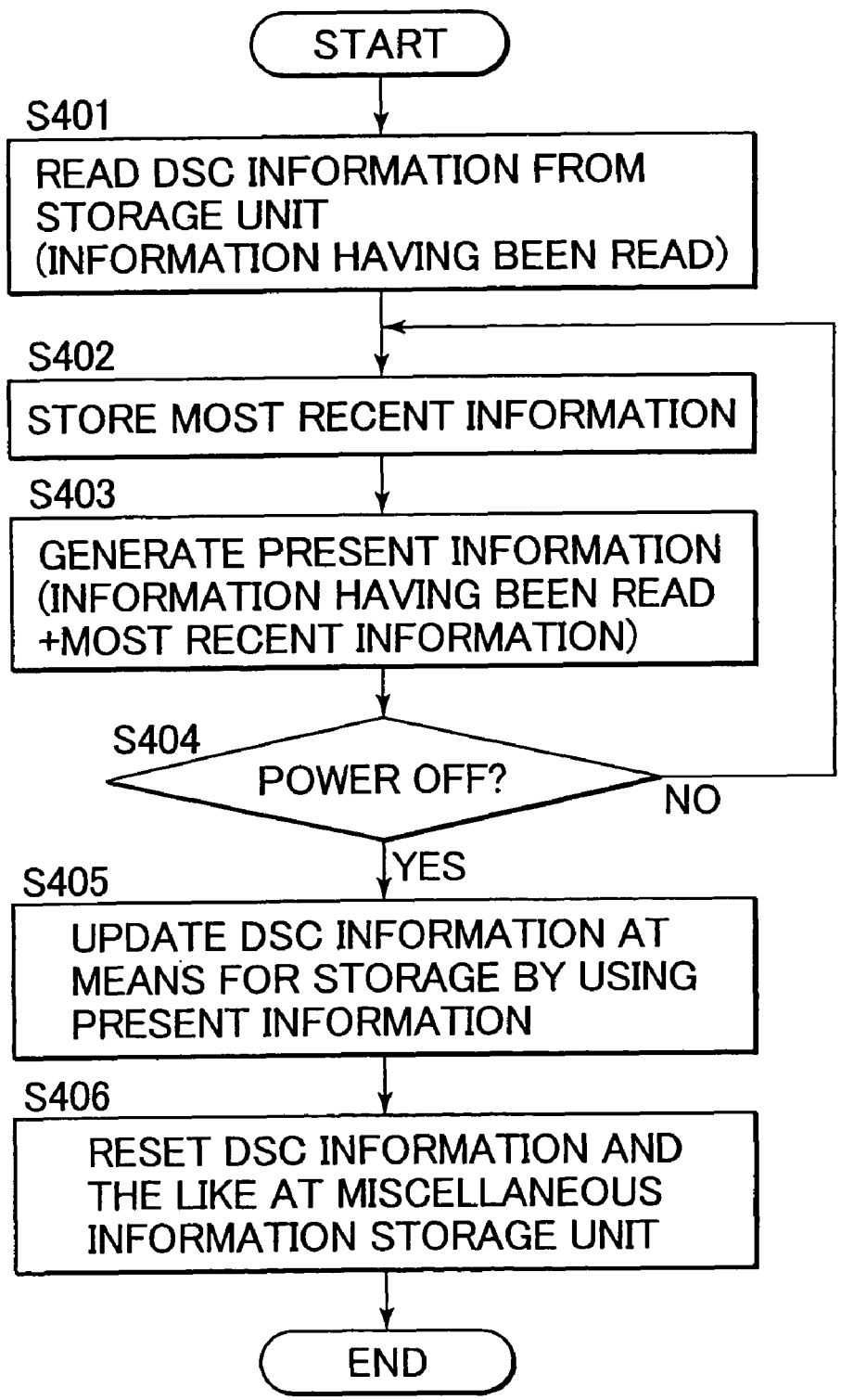
FIG. 14 presents a flowchart of the processing executed on information related to the DSC.

Information related to the DSC is stored in the means for storage 203 in the embodiment. The DSC-related information is stored by the CPU 430 during the end processing executed in the DSC 100. The DSC-related information includes the accumulated length of time over which the shutter button has been pressed half way down, the number of photographs having been taken, the number of times at which light has been emitted at the light emitting illumination unit 416, the accumulated length of time over which the zoom has been engaged, the length of time over which the monitor has been in an ON state and the length of time over which the DSC has been engaged in operation. It is to be noted that the DSC-related information is stored at the means for storage 203 is reset when the secondary battery 201 becomes charge to a sufficient extent, e.g., to an extent equal to or greater than the charge rate of 85%. Then, the CPU 430 at the DSC 100 executes processing such as that shown in FIG. 14 on the DSC-related information. Namely, the DSC-related information is read out from the means for storage 203 and is stored into the miscellaneous information storage unit 172 as read information in step S401. This processing is executed when reading the remaining battery power in step S101 in FIG. 10.

In step S402, the time count unit 420 measures the length of time over which the shutter button has been pressed halfway down (halfway press time), and the cumulative value indicating the accumulated length of time over which the shutter button has been pressed halfway down is stored into the miscellaneous information storage unit 172 as most recent information. It is desirable to include the length of time over which the shutter button has been pressed all the way down in the accumulated halfway press time. The cumulative value may be calculated by, for instance, the CPU 430. It is to be noted that if the continuous AF mode setting has been selected as a photographing function condition, the accumulated length of time over which the photographing mode has been sustained is stored into the miscellaneous information storage unit 172, as well.

In addition, the number of times the shutter button has been pressed all the way down, i.e., the number of photographs taken, is counted and the count value is stored into the miscellaneous information storage unit 172 as most recent information. The number of times at which light has been emitted at the light emitting illumination unit 416 is also counted and the count value is stored into the miscellaneous information storage unit 172 as most recent information. The time count unit 420 measures the length of time over which the zoom control unit 413 has been engaged in operation (zoom operation time) and the value indicating the accumulated length of time over which the zoom control unit 413 has been engaged in operation is stored into the miscellaneous information storage unit 172 as most recent information.

The storage of the most recent information is executed whenever necessary as various operations are performed at the DSC 100 and the various functions of the DSC 100 are engaged. However, the accumulated length of halfway press time and the accumulated length of zoom operation time may be simply measured at the time count unit 420.

In step S403, the sums of the values indicated in the information having been read and the values indicated in the most recent information are obtained as present information indicating the present state of the DSC.

The processing in steps S402 and S403 is executed concurrently with the photographing mode processing in step S107 in FIG. 11 and the reproduction mode processing in step S117 in FIG. 11.

In step S404, a decision is made as to whether or not the power switch has been turned off, and the operation returns to step S402 if it is decided that the power switch has not been turned off whereas the operation proceeds to step S405 if it is decided that the power switch has been turned off.

In step S405, the present information is provided to the CPU 204 at the battery pack 200. Then, the present information is used to update the DSC-related information stored in the means for storage 203 via the CPU 204.

In step S406, the values having been measured at the time count unit 420 and the values stored in the miscellaneous information storage unit 172 are all reset to 0.

The processing in steps S405 and S406 is executed concurrently with the end processing in step S130 in FIG. 11.

Since the DSC-related information stored at the battery pack 200 is reset as the secondary battery 201 becomes charged, the DSC-related information stored at the means for storage 203 indicates the accumulated length of halfway press time, the number of photographs having been taken, the number of times at which light has been emitted at the light emitting illumination unit 416, the accumulated length of zoom operation time, the length of time over which the monitor has been on and the length of time over which the DSC has been engaged in operation after the battery pack 200 was charged most recently.

The DSC 100 executes processing by using the DSC-related information to provide various types of information useful to the user of the DSC 100. This processing is to be described in detail later.

It is to be noted that the remaining battery power R alone may be initially read and the DSC-related information may be read only if the remaining battery power R is judged to be equal to or greater than the first predetermined value or the third predetermined, instead.

An example of the useful information that may be provided to the user of the DSC 100 based upon the DSC-related information is now explained.

The CPU 430 reads the remaining battery power R in response to a specific operation performed at the DSC 100. Then, based upon consumed battery power ascertained in correspondence to the remaining battery power at the charge end read in step S101 in FIG. 10 and the remaining battery power R and the number of photographs having been taken indicated in the present information, the consumed battery capacity quantity (performance value) per single photographed image is calculated. And a number of photographs that can be taken is estimated by using the consumed battery capacity quantity per single photographed image and is displayed at the monitor display unit 412. The estimated value is stored into the means for storage 203 via the CPU 204 of the battery pack 200 and it also is indicated at the indicator unit 207. Thus, the user can ascertain the estimated number of photographs that can be taken by checking the value indicated at the indicator unit 207, even when the battery pack 200 is disengaged from the DSC 100. If the user has a plurality of battery packs, he can choose a battery pack with a sufficient level of battery power remaining to take the desired number of pictures.

The battery power needed to photograph a single image fluctuates depending upon the length of time over which the display monitor 412 remains in an ON state while photographing the image (which is affected by the length of time required to determine the composition and the length of time required to check the photographic image), the length of time over which the shutter button is held halfway down (corresponding to the length of time over which the AF operation is executed), the length of time over which the zoom operation is executed and the like. These time lengths and the frequency with which the corresponding components are engaged in operation tend to vary among individual photographers. The need to emit light with the light emitting illumination unit 416 arises when photographing images at a specific time of day or under specific lighting conditions. For this reason, as long as a given photographer keeps taking photographs with a photographing pattern similar to the previous photographing pattern, the battery power needed to photograph a single image does not change much. Under such circumstances, the estimated value will prove useful to the user.

While the number of images that can be photographed may be calculated based upon the theoretical power consumption quantity corresponding to the standard photographing behavior pattern anticipated by the digital camera manufacturer, the estimated value obtained based upon the actual number of photographed images and the corresponding consumed battery power (the performance value) in the embodiment described above achieves a higher degree of accuracy by reflecting the photographing behavior pattern of the specific photographer.

The CPU 430 reads and checks the remaining battery power R when the power to the DSC 100 is turned on. The CPU 430 calculates the estimated value at this point, too, if the remaining battery power R is less than a predetermined value and displays the estimated value at the monitor display unit 412 and the display panel unit 421 to warn the user that the battery power R is running low. It will be particularly effective to warn the user by superimposing the estimated value over a photographic image displayed at the monitor display unit 412. If the remaining battery power is equal to or greater than the predetermined value, the processing ends without estimating the number of images that can be photographed, since a sufficient level of battery power is still available and the user can take photographs without worrying about the battery power running low.

In addition, the number of images that can be photographed is also estimated in the end processing (executed in step S130 in FIG. 11). It is desirable to provide a non-visual warning such as a warning sound or a warning vibration together with the display of the number of images that can be photographed. Since the user can verify how many more image as can be taken on the remaining battery power when ending use of the DSC 100, he is able to make an accurate judgment as to whether or not the battery pack 200 needs to be charged before he next uses the DSC 100. Thus, the user can prevent a trouble in which he can not perform a desired photographing operation due to a depleted battery when he is ready to use the DSC 100. It is desirable to indicate the number of images that can be photographed having been estimated during the end processing at the indicator unit 207 as described earlier, regardless of whether a large number of images or a small number of images can be photographed on the remaining battery power. Moreover, the number of images that can be photographed having been estimated during the end processing may be indicated at an indicator unit 207 of a battery pack 200 which is used in a silver halide film camera instead of a DSC, by adopting the processing principal explained above, to achieve similar advantages.

FIG. 15 presents an example of a display that may be brought up at the monitor display unit to indicate varying numbers of images that can be photographed under different photographing conditions.

The above described embodiments are examples, and various modifications can be made without departing from the spirit and scope of the invention.

What is claimed is:

1. A power system comprising:
a battery unit that includes a battery; and
an apparatus main body that operates on power supplied from the battery in the battery unit mounted thereat, the battery unit and the apparatus main body being engaged in information exchange, wherein:
a work volume value, defined by an amount of an operation having been executed in the apparatus main body, is transmitted from the apparatus main body to the battery unit over a predetermined cycle;
the battery unit calculates a cumulative work volume value of the work volume value at the apparatus main body and stores the cumulative work volume value therein, and the battery unit also detects a consumed battery capacity value indicating an extent to which a battery power has been consumed at the apparatus main body;
the cumulative work volume value, the consumed battery capacity value and a charged battery capacity value are transmitted from the battery unit to the apparatus main body over the predetermined cycle; and
the apparatus main body displays a battery use rate indicating an extent to which the battery has been used based upon the consumed battery capacity value and the charged battery capacity value, and also displays the cumulative work volume value at the apparatus main body.

2. A power system according to claim 1, wherein:
different operating modes of the apparatus main body are classified in correspondence to varying levels of power consumption;
work volume values each corresponding to one of the operating modes are transmitted from the apparatus main body to the battery unit;
the battery unit calculates and stores therein cumulative work volume values corresponding to the individual operating modes of the apparatus main body and transmits the cumulative work volume values corresponding to the individual operating modes to the apparatus main body; and
the apparatus main body displays the battery use rate and the cumulative work volume values corresponding to the individual operating modes of the apparatus main body.

3. A power system according to claim 1, wherein:
the battery unit allows the battery to be charged with a charge apparatus;
the battery unit and the charge apparatus exchange information with each other; and
the cumulative work volume value stored in the battery unit is reset to 0 when the battery has been charged by the charge apparatus.

4. A power system according to claim 2, wherein:
the battery unit allows the battery to be charged with a charge apparatus;
the battery unit and the charge apparatus exchange information with each other; and
the cumulative work volume value stored in the battery unit is reset to 0 when the battery has been charged by the charge apparatus.

5. A power system according to claim 1, wherein:
the battery unit allows the battery to be charged with a charge apparatus;
the battery unit and the charge apparatus exchange information with each other;
the battery unit detects the charged battery capacity value and transmits the detected charged battery capacity value to the charge apparatus;
the charge apparatus makes a decision based upon the charged capacity value transmitted from the battery unit as to whether or not the battery is in a fully charged state and ends a charge of the battery once the battery is judged to be in the fully charged state; and
the battery unit resets the consumed battery capacity value stored in memory at the battery unit to 0 when the charge of the battery ends.

6. A power system according to claim 1, wherein:
the apparatus main body is a camera; and
the work volume value is a number of frames of images photographed in the camera.

7. A power system according to claim 1, wherein:
the apparatus main body is a camera; and
the work volume value is a length of time over which the camera has been engaged in use.

* * * * *